United States Patent
Tindola et al.

(10) Patent No.: US 12,089,100 B2
(45) Date of Patent: Sep. 10, 2024

(54) RADIO (NR) CELL ADDITION IN NON-STANDALONE MODE

(71) Applicant: QUALCOMM Incorporated, San Diego, CA (US)

(72) Inventors: Rishika Tindola, Hyderabad (IN); Uttam Vyas, Hyderabad (IN); Muralidharan Murugan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/506,519

(22) Filed: Oct. 20, 2021

(65) Prior Publication Data

US 2023/0121194 A1    Apr. 20, 2023

(51) Int. Cl.
*H04W 36/00* (2009.01)
*H04W 36/08* (2009.01)
*H04W 36/30* (2009.01)
*H04W 60/04* (2009.01)

(52) U.S. Cl.
CPC . *H04W 36/00837* (2018.08); *H04W 36/0058* (2018.08); *H04W 36/0077* (2013.01); *H04W 36/08* (2013.01); *H04W 36/30* (2013.01); *H04W 60/04* (2013.01)

(58) Field of Classification Search
CPC ....... H04W 36/00837; H04W 36/0058; H04W 36/0077; H04W 36/08; H04W 36/30; H04W 60/04; H04W 36/362; H04W 8/183; H04W 36/0069; H04W 88/06
See application file for complete search history.

(56) References Cited

U.S. PATENT DOCUMENTS

| | | | | |
|---|---|---|---|---|
| 11,792,700 | B2 * | 10/2023 | Ma | H04W 36/08 455/437 |
| 2020/0351694 | A1 * | 11/2020 | Chen | H04W 76/27 |
| 2020/0359247 | A1 * | 11/2020 | Yi | H04W 24/10 |
| 2021/0321310 | A1 * | 10/2021 | Latheef | H04W 36/0069 |
| 2022/0116805 | A1 * | 4/2022 | Wang | H04W 24/02 |
| 2022/0150818 | A1 * | 5/2022 | Liberg | H04B 7/18539 |
| 2022/0182911 | A1 * | 6/2022 | Eklöf | H04W 36/24 |
| 2022/0264397 | A1 * | 8/2022 | da Silva | H04W 36/0058 |
| 2022/0353720 | A1 * | 11/2022 | Nader | H04W 24/08 |
| 2022/0386195 | A1 * | 12/2022 | Ishii | H04W 36/0038 |
| 2023/0363027 | A1 * | 11/2023 | Da Silva | H04W 76/20 |
| 2023/0370907 | A1 * | 11/2023 | Hwang | H04W 76/20 |
| 2023/0370915 | A1 * | 11/2023 | Da Silva | H04W 36/0079 |

* cited by examiner

*Primary Examiner* — Kibrom T Hailu
(74) *Attorney, Agent, or Firm* — Loza & Loza, LLP

(57) ABSTRACT

Aspects relate to techniques for expediting New Radio (NR) cell addition in non-standalone (NSA) mode. The UE may receive a conditional handover (CHO) command from a first anchor cell operating a first frequency range (e.g., a Long Term Evolution (LTE) frequency range) that enables the UE to subsequently select a different anchor cell to which to perform a handover. The UE may then receive a deconfiguration from the first anchor cell of a measurement object for secondary cell addition in a second frequency range (e.g., a NR frequency range). Based on the CHO command and the deconfiguration of the measurement object, the UE may then perform a handover to a second anchor cell in the first frequency range to facilitate addition of at least one secondary cell in the second frequency range.

30 Claims, 14 Drawing Sheets

RADIO (NR) CELL ADDITION IN NON-STANDALONE MODE

TECHNICAL FIELD

The technology discussed below relates generally to wireless communication systems, and more particularly, to adding a new radio (NR) cell while connected to a legacy cell in non-standalone mode.

INTRODUCTION

Fifth Generation (5G) New Radio (NR) networks may deploy cells that utilize either a millimeter wave (e.g., FR2) carrier or a sub-6 GHz (e.g., FR1) carrier to facilitate communication between a base station and a user equipment (UE). In some wireless communication networks, a UE may be configured to simultaneously communicate on multiple carriers. For example, a UE may include two or more subscriber identity module (SIM) cards (e.g., universal SIMs (USIMs)), each providing a different service by a different mobile operator. One SIM card may be associated with a dedicated data subscription (DDS) that may be used by the UE for data services, while another SIM card may be associated with a non-DDS (n-DDS) that may be used by the UE for voice calls.

In such multi-SIM card (MSIM) devices, each SIM card may operate in a respective radio access technology (RAT) and may be configured for use in a respective frequency range. For example, one of the SIM cards may be configured for operation in a NR RAT, while the other SIM card may be configured for operation in a legacy RAT. The legacy RAT may be, for example, Fourth Generation (4G) Long Term Evolution (LTE), Third Generation (3G) Universal Mobile Telecommunications Systems (UMTS) wideband code division multiple access (WCDMA), code division multiple access (CDMA), Global System for Mobile Communication (GSM), or other suitable legacy RAT. Other MSIM device configurations may include two SIM cards operating in the same RAT (e.g., both LTE or both NR).

MSIM UEs may be utilized, for example, in a 5G non-standalone (NSA) mode with Evolved-Universal Terrestrial Radio Access New Radio dual connectivity (EN-DC). In EN-DC, the UE may be simultaneously connected to both LTE and NR or to LTE for the control plane and NR for the user plane. The LTE RAT serves as the anchor carrier that allows FR1/FR2 to be added. For example, a UE can perform initial registration with an LTE base station (e.g., evolved Node B (eNB)) that supports the 5G NSA mode, and then add one or more 5G NR cells (e.g., one or more 5G base stations, referred to herein as g Node Bs (gNBs)). Here, the 5G NR radio access network (e.g., 5G NR cell) may connect to the 4G Evolved Packet Core (EPC) core network.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured for wireless communication is disclose. The UE includes a transceiver, a memory, and a processor coupled to the transceiver and the memory. The processor and the memory can be configured to receive a conditional handover command from a first anchor cell operating in a first frequency range via the transceiver to enable the UE to subsequently select a different anchor cell to which to perform a handover, and receive a deconfiguration via the transceiver from the first anchor cell of a first measurement object for secondary cell addition in a second frequency range different than the first frequency range, where the deconfiguration occurs prior to the secondary cell addition. The processor and the memory can be further configured to perform the handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range.

Another example provides a method of wireless communication at a user equipment (UE). The method includes receiving a conditional handover command from a first anchor cell operating in a first frequency range to enable the UE to subsequently select a different anchor cell to which to perform a handover, and receiving a deconfiguration from the first anchor cell of a first measurement object for secondary cell addition in a second frequency range different than the first frequency range, where the deconfiguration occurs prior to the secondary cell addition. The method further includes performing the handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range.

Another example provides an apparatus configured for wireless communication. The apparatus includes means for receiving a conditional handover command from a first anchor cell operating in a first frequency range to enable the UE to subsequently select a different anchor cell to which to perform a handover, and means for receiving a deconfiguration from the first anchor cell of a first measurement object for secondary cell addition in a second frequency range different than the first frequency range, where the deconfiguration occurs prior to the secondary cell addition. The apparatus further includes means for performing the handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range.

These and other aspects of the invention will become more fully understood upon a review of the detailed description, which follows. Other aspects, features, and examples will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples it should be understood that such exemplary examples can be implemented in various devices, systems, and methods.

DETAILED DESCRIPTION

Figure 1:
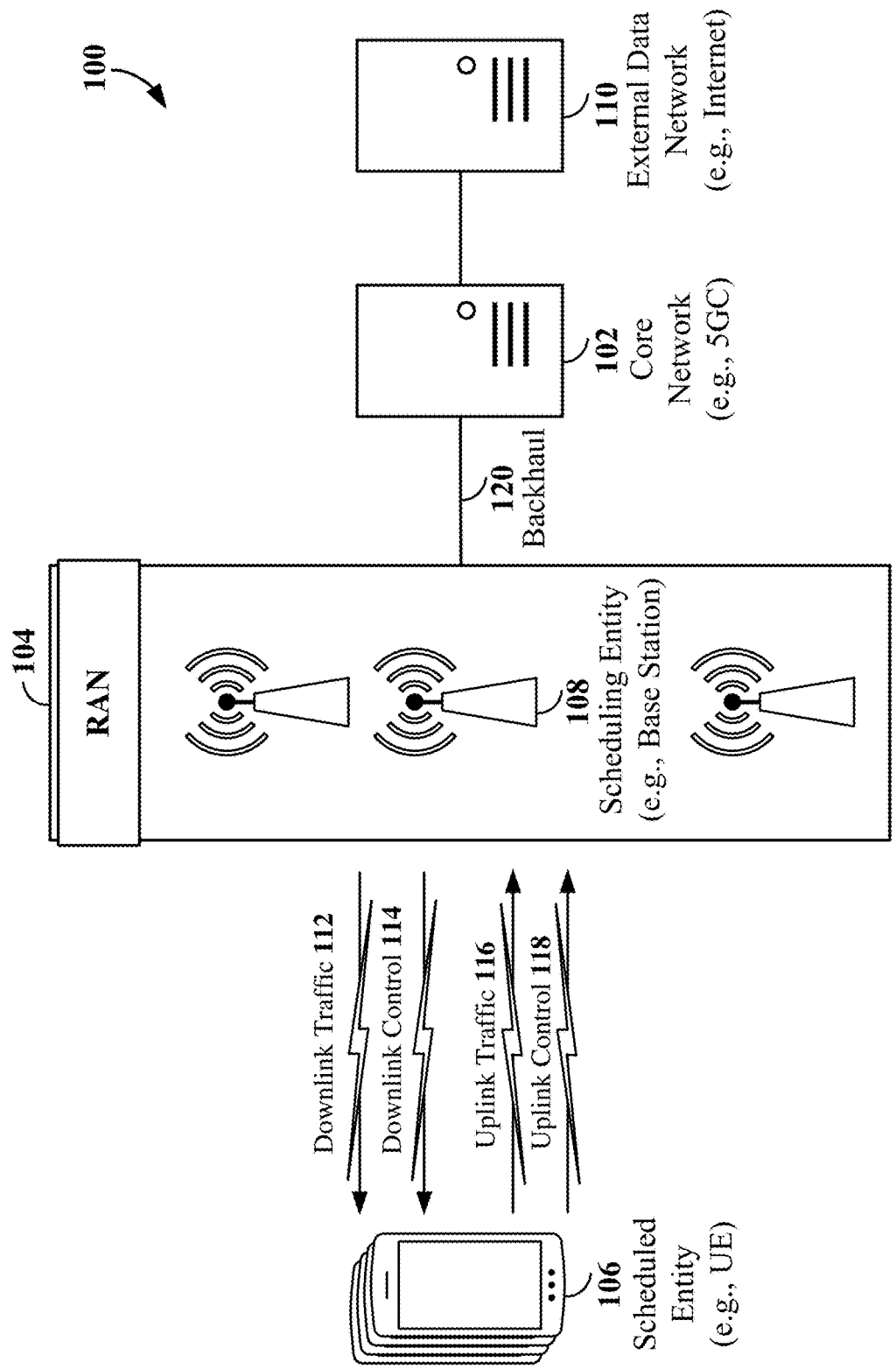
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements, end-user devices, etc. of varying sizes, shapes and constitution.

Various aspects relate to NR cell addition in NSA mode. For example, in EN-DC, a base station (e.g., eNB) serving an LTE anchor cell may transmit a measurement configuration including one or more measurement objects to a UE for NR cell addition. Based on the measurement configuration, the UE may perform measurements of one or more neighbor NR cells and transmit a NR measurement report to the anchor cell including the measurements. Based on the NR measurement report, the anchor cell may add one or more secondary cells (e.g., a secondary cell group (SCG)) for EN-DC communication. In some examples, the UE may not transmit the NR measurement report in time or the anchor cell may fail to add the SCG. In this example, the base station may deconfigure the NR measurement object, and the UE may have may to have to wait for an extended period of time or until a new LTE connection with a new LTE anchor cell to add a SCG to receive NR services.

Therefore, various aspects of the disclosure relate to techniques for expediting NR cell addition in NSA mode. In some examples, the UE may utilize a conditional handover (CHO) feature to facilitate NR cell addition in NSA mode. For example, the UE may receive a CHO command from a first (serving) anchor cell operating a first frequency range (e.g., an LTE frequency range) that enables the UE to subsequently select a different anchor cell to which to perform a handover. The UE may then receive a deconfiguration from the first anchor cell of a measurement object for secondary cell addition in a different frequency range (e.g., a NR frequency range). Based on the CHO command and the deconfiguration of the measurement object, the UE may then perform a handover to a second anchor cell in the first frequency range to facilitate addition of at least one secondary cell.

In some examples, after performing the handover, the UE may receive a measurement object from the second anchor cell. The UE may then perform measurements on neighbor NR cells based on the measurement object and transmit a measurement report to the second anchor cell including the measurements for SCG addition with the second anchor cell.

In some examples, the UE may add an offset to a measured link quality on the second anchor cell to avoid a ping pong handover back to the first anchor cell.

In some examples, the UE may initiate a timer upon performing the handover. The UE may stop the time in response to receiving the measurement report from the second anchor cell or blind addition of one or more secondary cells by the second anchor cell. In addition, upon expiration of the timer, the UE may perform a local connection release from the UE and transmit either a service request or a tracking area update (TAU) to the second anchor cell to trigger reception of a new measurement object from the second anchor cell for SCG addition.

In some examples, the second anchor cell selected by the UE may have a link quality that is greater than a threshold. In addition, the second anchor cell may be selected from a set of one or more anchor cells. The UE may select the second anchor cell having the highest link quality among the set of one or more anchor cells. In some examples, the UE may access a fingerprint database including anchor cell information of previously identified neighbor anchor cells and compare a list of cells included in the CHO command with the fingerprint database to identify the set of one or more anchor cells.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
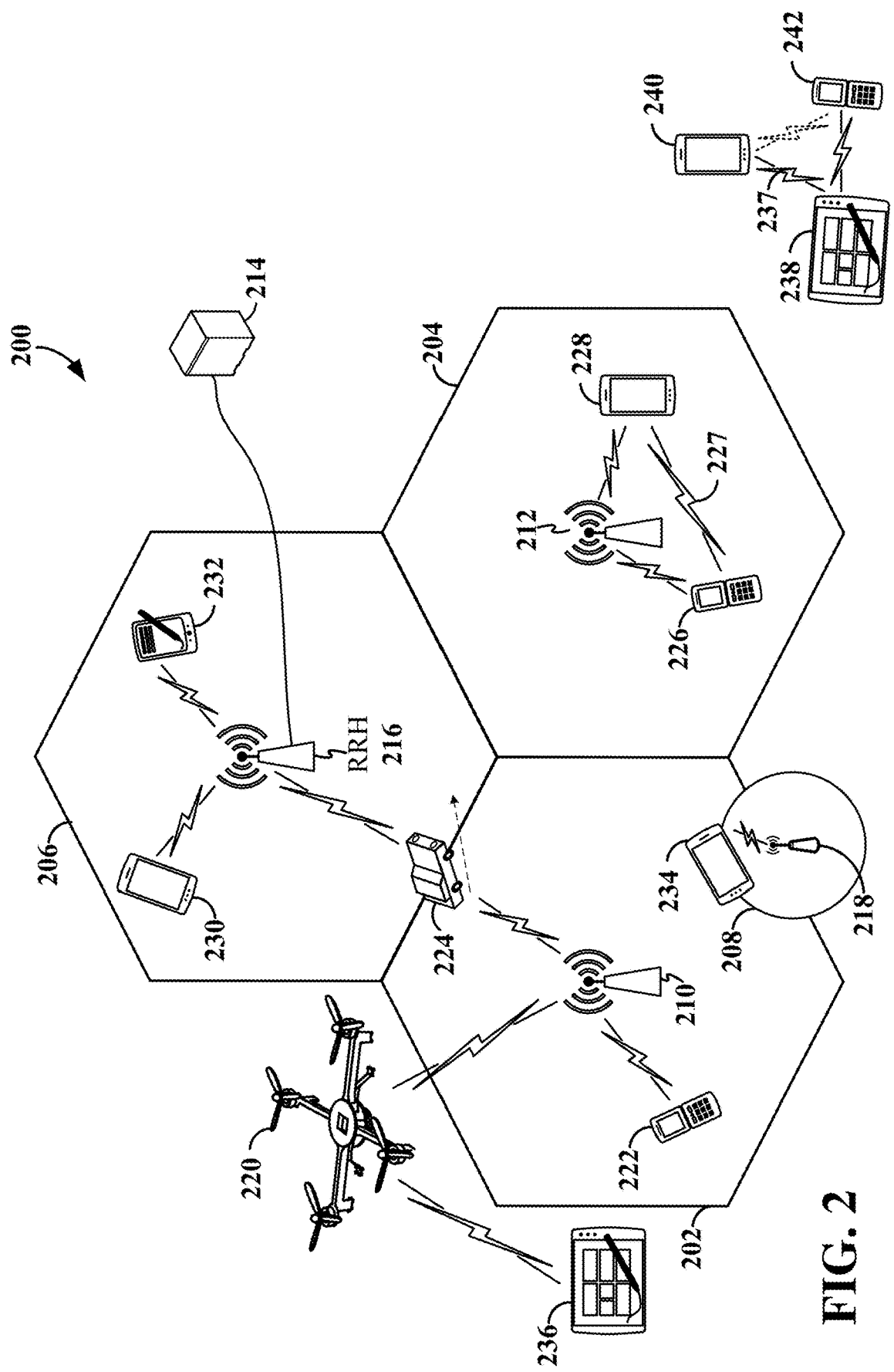
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHZ-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHZ-71 GHZ), FR4 (52.6 GHZ-114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
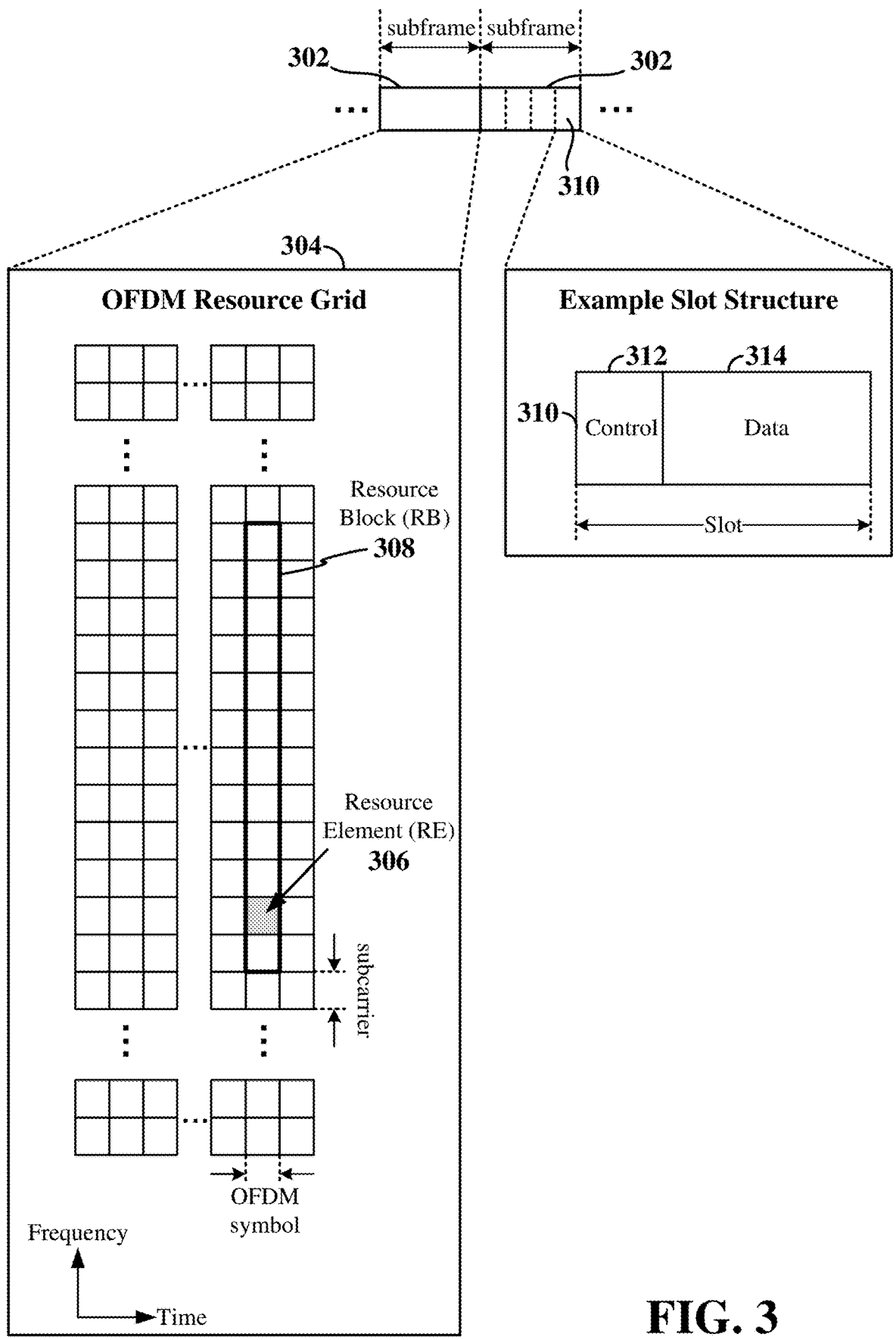
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformation Type 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

NR 5G wireless communication systems may support one or more frequency ranges, including FR1, FR2 or a legacy LTE frequency range. For example, the LTE frequency range may include the E-UTRA frequency bands between 350 MHz and 3.8 GHz. In some examples, each cell may support a single frequency range (e.g., FR1, FR2 or legacy LTE) and may further support one or more frequency bands (e.g., carrier frequencies) within a particular frequency range. In addition, one or more cells may operate as anchor cells enabling dual connectivity with neighbor cell(s) supporting a different frequency range. In some examples, one or more cells may be NR dual connectivity (NR DC) cells that support dual connectivity between FR1 and FR2 (e.g., FR1+FR2 DC). For example, a NR DC anchor cell may be configured for communication with UEs in the cell over FR1, and may further support dual connectivity by the UEs to enable simultaneous communication over FR1 with the NR DC anchor cell and over FR2 with one or more neighbor NR cells. In other examples, one or more cells may be Evolved-Universal Terrestrial Radio Access New Radio dual connectivity (EN-DC) that support dual connectivity between an LTE frequency band and either FR1 or FR2, as described in more detail below in connection with FIG. 5. For example, an LTE anchor cell may be configured for communication with UEs in the cell over an LTE frequency band, and may further support dual connectivity by the UEs to enable simultaneous communication over the LTE frequency band with the LTE anchor cell and over either FR1 or FR2 with one or more neighbor NR cells.

Figure 4:
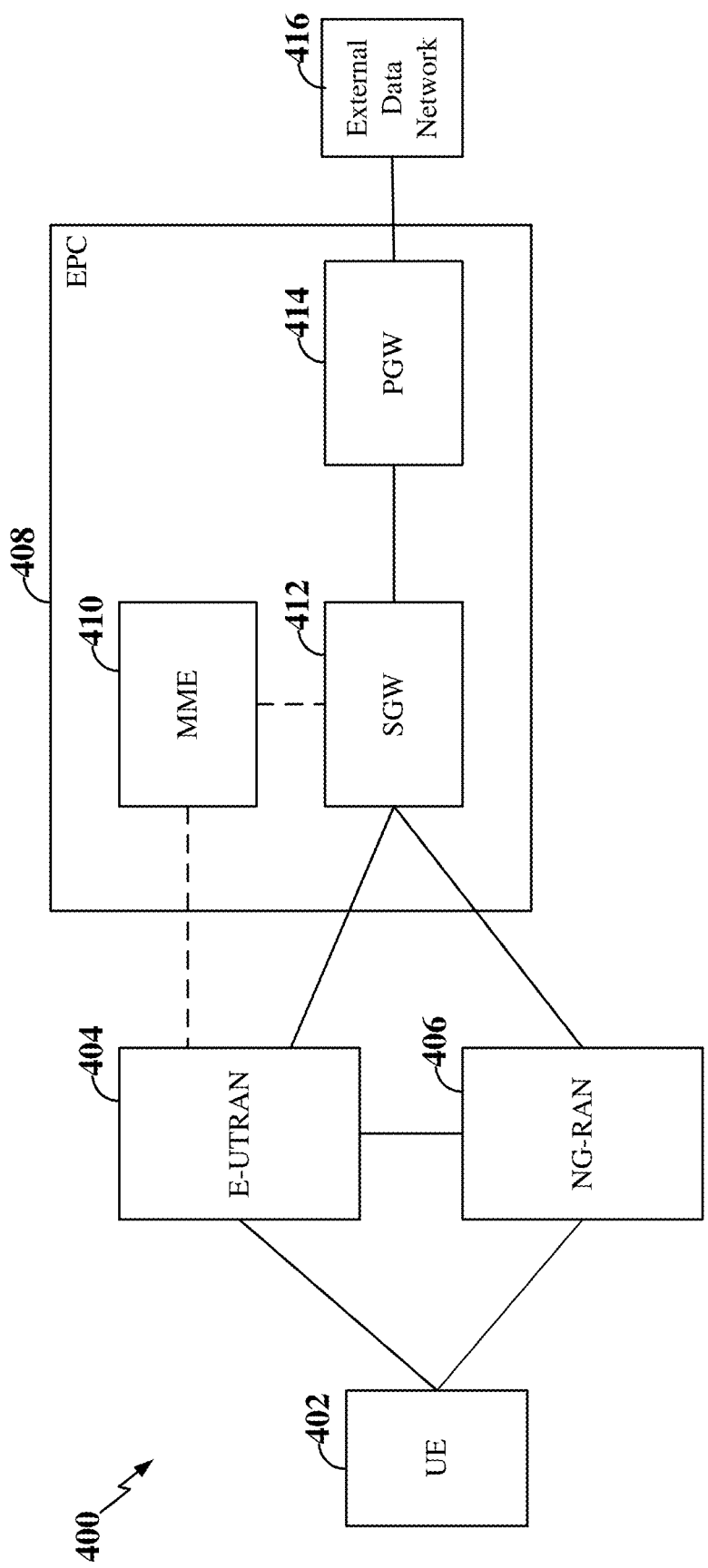
FIG. 4 is a block diagram illustrating an example of an EN-DC system according to some aspects.

Referring now to FIG. 4, by way of example and without limitation, a block diagram illustrating an example of various components of an EN-DC system 400 is provided. In some examples, the EN-DC system 400 may be the same wireless communication system 100 described above and illustrated in FIG. 1. The EN-DC system 400 includes a user equipment (UE) 402, a NG-RAN 406 (e.g., a gNB), an LTE RAN (E-UTRAN) 404 (e.g., an eNB), and a core network 408. By virtue of the wireless communication system 400, the UE 402 may be enabled to carry out data communication with an external data network 416, such as (but not limited to) the Internet, Ethernet network, or a local area network.

The core network 408 may be an Evolved Packet Core (EPC) and may include, for example, a mobility management entity (MME) 410, a serving gateway (SGW) 412 and a packet data network gateway (PGW) 414. The MME 410 is the control node that processes the signaling between the UE 402 and the EPC 408. Generally, the MME 410 provides bearer and connection management for the UE 402 according to mechanisms defined for the EPC 408. For example, the MME 410 may manage security when the UE 402 connects to the E-UTRAN 404 by using information provided by a Home Subscriber Server (HSS, not shown) to authenticate UEs and update UEs location information in the HSS. The MME 410 may further maintain the tracking area identity (TAI) of the current tracking area (e.g., group of neighboring cells/eNBs) within which the UE 402 is located to enable paging of the UE 402 when the UE is in idle mode. Moreover, the MME 410 may manage connectivity via Packet Data Connections (PDNs) between the UE 402 and the PGW 414, and determine and provide a set of Quality of Service (QOS) parameters to the E-UTRAN 404.

To establish a connection to the EPC 408 via the E-UTRAN 404, the UE 402 may transmit a registration request and PDN session establishment request to the EPC 408 via the E-UTRAN 404. The MME 410 may process the registration request and PDN session establishment request and establish a PDN session between the UE 402 and the external DN 416 via the SGW 412 and PGW 414.

To enable dual connectivity, the 4G LTE infrastructure (e.g., E-UTRAN eNB 404 and EPC 408) supports a connection to the NG-RAN 406 (e.g., a 4G NR gNB). Here, the NG-RAN gNB 406 connects to the EPC 408 at the data plane level through the SGW 412. The NG-RAN gNB 406 does not connect to the MME 410, and as such, does not have a control plane connection to the EPC 408. The NG-RAN gNB 406 connects to the E-UTRAN eNB 404 to activate and deactivate 4G bearers. Therefore, the NG-RAN eNB acts as an anchor or master node and the NG-RAN gNB acts as a secondary node. Here, the E-UTRAN eNB 404 may be configured for communication with the UE 402 using an LTE frequency band, while the NG-RAN gNB 406 may be configured for communication with the UE 402 using a NR frequency band (e.g., FR1 or FR2).

In an example, after the UE 402 camps on to the E-UTRAN eNB 404, the UE can signal to the EPC 408 (e.g., the MME 410), that the UE 402 is capable of simultaneous connection to both the E-UTRAN 404 and NG-RAN 406. The MME 410 confirms that the UE 402 is authorized for dual connectivity and notifies the E-UTRAN eNB 404 that the UE 402 is permitted to connect to the NG-RAN 406. The E-UTRAN eNB 404 may then communicate with the NG-RAN gNB 406 to activate a bearer on the NG-RAN gNB 406. The UE 402 can then receive a radio resource control (RRC) reconfiguration message assigning the 5G bearer to the UE 402. The UE 402 can then access the NG-RAN gNB 406 using a random access procedure to establish simultaneous dual connectivity to both the E-UTRAN eNB 404 and NG-RAN gNB 406. Additional secondary nodes (e.g., other gNBs) may also be added using a similar procedure.

Figure 5:
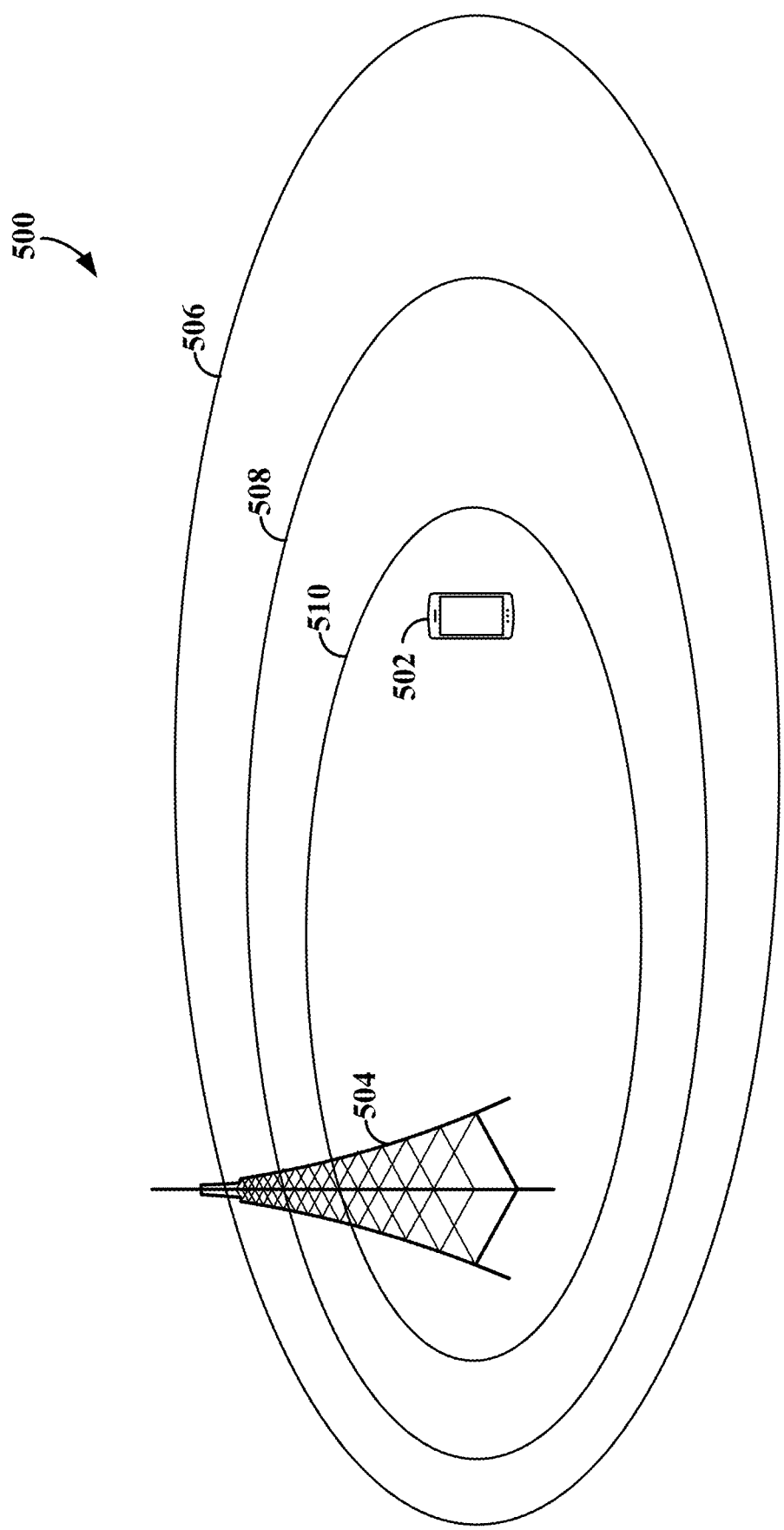
FIG. 5 is a diagram illustrating a multi-RAT deployment environment according to some aspects.

FIG. 5 is a diagram illustrating a multi-RAT deployment environment 500 according to some aspects. In the multi-RAT deployment environment 500 shown in FIG. 5, a UE 502 may communicate with a base station 504 using one or more of a plurality of RATs. For example, the base station 504 may include a plurality of co-located TRPs, each serving a respective cell 506, 508, and 510. Each cell 506, 508, and 510 may communicate using a respective RAT and corresponding frequency range. In some examples, the RATs may include LTE and NR. For example, a first cell 506 may be an LTE cell that operates in an LTE frequency range to provide wide area coverage to the UE 502. In addition, a second cell 508 may be a NR cell that operates in a sub-6 GHz frequency range (e.g., FR1), and a third cell 510 may be a NR cell that operates in a mmWave frequency range (e.g., FR2 or higher).

In some examples, the UE 502 may communicate with the base station 504 over two or more of the cells 506, 508, and 510 in a multi-RAT dual connectivity (MR-DC) mode, such as EN-DC, as described above. EN-DC may be utilized in a non-standalone (NSA) mode of 5G NR in which the UE 502 is simultaneously connected to both LTE and NR or to LTE for the control plane and NR for the user plane. In EN-DC, the LTE cell (e.g., cell 506) may be referred to as the anchor cell that provides a radio resource control (RRC) connection to the UE 502. The anchor cell 506 may activate or add one or more additional NR cells (e.g., cells 508 and/or 510) to provide 5G services to the UE 502. In an example, the UE 502 may simultaneously communicate with the LTE anchor cell 506 over an LTE frequency band and with one or more neighbor NR cells (e.g., cells 508 and/or 510) over FR1 and/or FR2.

In other examples, the UE 502 may communicate with the base station 504 in a NR standalone (SA) mode in which LTE is not utilized as the anchor cell. For example, the UE 502 may communicate with the base station 504 in a NR DC mode. As described above, NR DC mode supports dual connectivity between FR1 and FR2 (e.g., FR1+FR2 DC). For example, a UE 502 may be configured for simultaneous communication with an NR anchor cell 508 over FR1 and with one or more neighbor NR cells (e.g., cell 510) over FR2. In other examples, the UE 502 may be configured to communicate over a single one of the NR cells (e.g., cell 508 or 510) using FR1 or FR2.

In some examples, the UE 502 may be a multi-SIM card (MSIM) UE that includes two or more universal SIM (USIM) cards, each associated with a respective subscription (SUB) and respective phone number. For example, the UE 502 may include a first USIM having a dedicated data subscription (DDS) that may be used by the UE 502 for data services, and a second USIM having a non-DDS (n-DDS) that may be used by the UE 502 for voice calls. In some examples, each USIM may communicate in a respective RAT. For example, the DDS USIM may utilize a NR RAT to communicate on cell 508 or 510, and the n-DDS USIM may utilize an LTE RAT to communicate on cell 506.

Figure 6:
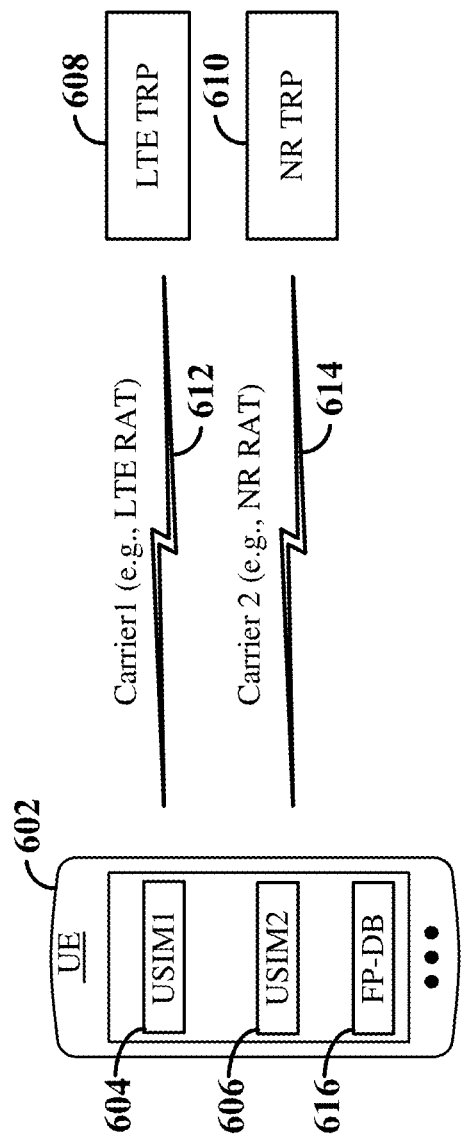
FIG. 6 is a diagram illustrating a multi-subscriber identity module card (MSIM) wireless communication device according to some aspects.

FIG. 6 is a diagram illustrating a multi-subscriber identity module card (MSIM) wireless communication device according to some aspects. In the example shown in FIG. 6, the wireless communication device (UE 602) includes two USIM cards (USIM1 604 and USIM2 606). Each USIM card 604 and 606 is configured for communication in a different RAT. For example, USIM1 604 is associated with a first subscription (SUB1) and is configured for communication utilizing an LTE RAT and USIM2 606 is associated with a second subscription (SUB2) and is configured for communication utilizing a NR RAT. Thus, USIM1 604 may communicate signals 612 with an LTE TRP 608 over a first carrier frequency in a first frequency band of an LTE frequency range and USIM2 606 may communicate signals 614 with a NR TRP 610 over a second carrier frequency in a second frequency band of a NR frequency range (e.g., FR1 or FR2). Each TRP 608 and 610 may be a base station (e.g., eNB or gNB), remote radio head (RRH) of a gNB or eNB, or other scheduling entity similar to those illustrated in any of FIG. 1 or 2.

For example, USIM2 606 may have a DDS for communication of data 614 (e.g., e-mail, Internet, etc.) with the NR TRP 610 and USIM1 604 may have a DDS for communication of voice signals 612 with the LTE TRP 608. In this example, USIM2 606 may be in a radio resource control (RRC) connected mode, while USIM1 604 may be in an RRC idle mode until a voice call is made or received by the UE 602. This configuration of USIM cards 604 and 606 may be referred to as a dual SIM dual standby (DSDS) mode in which the UE 602 includes a single transceiver for both USIM cards 604 and 606 and both USIM cards 604 and 606 are active, but only one USIM card 604 or 606 may use the transceiver for same direction communications at a time. For example, USIM2 606 may be in an RRC connected mode to send/receive data to/from the NR network, while USIM1 604 may be in an RRC idle mode, or vice-versa. In other examples, USIM2 606 may have the n-DDS, while USIM1 604 has the DDS.

In NSA mode, while the UE 602 is in an RRC connected state with the LTE TRP 608, the network can trigger NR measurements to add the NR TPR 610. Here, the NR TRP 610 may be representative of a secondary cell group (SCG) of one or more NR cells and the LTE TRP 608 may be representative of a primary cell (also referred to herein as an anchor cell). For example, the UE 602 may maintain a fingerprint database 616 for storing anchor cell information that indicates anchor cells (e.g., LTE anchor cells) and neighbor NR FR1/FR2 cells for each anchor cell previously identified in the area. The UE 602 may further update the fingerprint database 616 to include additional neighbor cells of identified anchor cells based on system information (e.g., neighbor cell information) provided by the network.

For example, after the UE 602 camps on the LTE anchor cell 608, the UE may inspect SIB2 to determine if the upperLayerIndication-r15 (e.g., indicating FR1/FR2 neighbor cells) is set to TRUE. If so, the UE may update the fingerprint database 616 accordingly. In addition, if the upperLayerIndication-r15 is set to TRUE, FR1/FR2 measurement objects may be configured by the network for the UE to report NR cell measurements (e.g., a link quality or signal strength measurement, such as the signal-to-interference-plus-noise ratio (SINR) or reference signal received power (RSRP)) for each of the neighbor NR cells. Based on the NR measurement report, the LTE anchor cell 608 may add a NR secondary cell group (SCG) (e.g., NR TRP 610) via an RRC reconfiguration message. However, if the UE 602 fails to send the NR measurement report or fails to add the SCG, the UE 602 may have to wait for an extended period of time or until a new LTE connection with a new LTE anchor cell to add a SCG to receive NR services.

Figure 7:
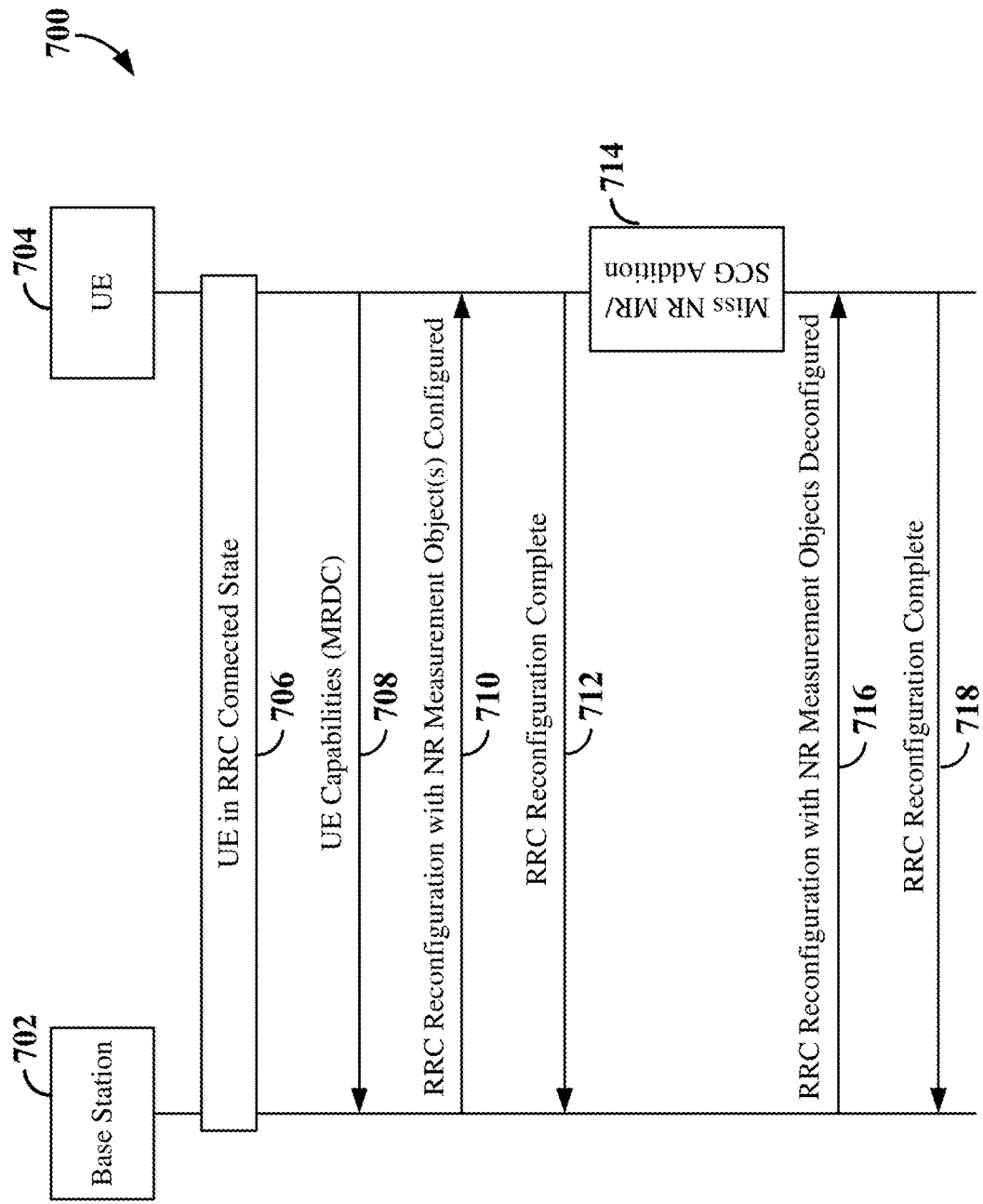
FIG. 7 is a diagram illustrating exemplary signaling for facilitating multi-RAT dual-connectivity (MR-DC) between a UE and a base station according to some aspects.

FIG. 7 illustrates exemplary signaling 700 for facilitating MR-DC between a UE 704 and a base station 702 according to some aspects. The base station 702 may correspond to any of the base stations (e.g., eNBs) or other scheduling entities illustrated in any of FIGS. 1 and/or 3-6. In addition, the UE 704 may correspond to any of the UEs or other scheduled entities illustrated in any of FIGS. 1 and/or 3-6.

At 706, the UE 704 may enter an RRC connected state on a cell served by the base station 702. For example, the cell may be an LTE anchor cell. At 708, the UE 704 may provide UE capabilities information to the base station 702. For example, the UE capabilities information may indicate that the UE 704 supports NR and MR-DC (e.g., EN-DC). Based on the UE capabilities, at 710, in NSA mode, the base station may transmit an RRC reconfiguration message to configure one or more measurement objects (including NR measurement objects) on the UE 704 to perform measurements (e.g., link quality measurements, such as SINR or RSRP) on one or more neighbor NR and/or LTE cells for SCG addition. For example, the base station 702 may transmit a measurement configuration including the measurement object(s) and reporting configuration(s) for reporting the measurements to the base station 702. Each measurement object may indicate the time/frequency and sub-carrier spacing of reference signals to be measured on neighboring cells (e.g., LTE and/or NR cells). Each reporting configuration may indicate the criteria that triggers the UE to send a measurement report (e.g., periodic or dynamic based on a measurement event), the reference signal type to report (e.g., SSB and/or CSI-RS), and a format of the measurement report.

At 712, the UE 704 may transmit an RRC reconfiguration complete message to confirm successful completion of the RRC reconfiguration. Based on the configured measurement object(s) and reporting configuration, the UE 704 normally would perform measurements on the neighbor cells and transmit a NR measurement report (MR) to the base station 702 including the cell measurements (e.g., a SINR or RSRP for each of the neighbor NR and/or LTE cells). Based on the NR measurement report, the base station 702 would then add a NR secondary cell group (SCG) via another RRC reconfiguration message that assigns 5G bearer(s) to the UE 704. The UE 704 may then add the SCG using a respective random access procedure for each NR cell to establish simultaneous dual connectivity to both the base station 702 (e.g., LTE anchor cell) and one or more NR cells.

However, at 714, the UE 704 may miss the NR measurement report (MR) or SCG addition for various reasons. In some examples, the UE 704 may be engaged in MSIM DSDS activities on another SUB during the time configured by the measurement object(s) to perform the NR cell measurements. For example, the UE may perform an acquisition procedure on USIM2 (SUB2) during the time that the UE 704 is configured to perform NR cell measurements and/or send the NR MR to the base station on USIM1 (SUB1). In other examples, the UE 704 may not trigger the NR MR in time for transmission to the base station 702. For example, the NR signal may not be stable enough to perform the cell measurements, the measurement object(s) may configure too many frequencies (NR and/or LTE) for the UE 704 to perform prior to sending the NR MR, NR measurements may be disabled on the UE 704, or one or more cells may be barred. In other examples, the UE 704 may transmit the NR MR, but the base station 702 may fail to add the SCG. For example, the base station 702 may be handling an IP multimedia subsystem (IMS) bearer addition for the UE 704, and as a result, may ignore the NR bearer addition.

After a period of time (e.g., approximately three seconds) from when the base station 702 should receive/process the NR MR, the base station 702 may deconfigure the measurement object(s). For example, at 716, the base station 702 may transmit an RRC reconfiguration message to deconfigure the one or more measurement objects on the UE 704. At 718, the UE 704 may then transmit an RRC reconfiguration complete message to confirm successful completion of the RRC reconfiguration (e.g., deconfiguration of the measurement objects).

In some networks, the base station 702 may configure measurement objects only once during the entire connection between the UE 704 and the base station 702. In other networks, the UE 704 may have to wait until the next instance of measurement object configuration (e.g., based on a periodicity of NR cell addition) to receive new measurement objects for SCG addition. This delay may be undesirable for a UE 704 that is NR capable.

Therefore, various aspects of the disclosure relate to techniques for expediting NR cell addition in NSA mode. In some examples, the UE 704 may utilize a conditional handover (CHO) feature to facilitate NR cell addition in NSA mode.

Figure 8:
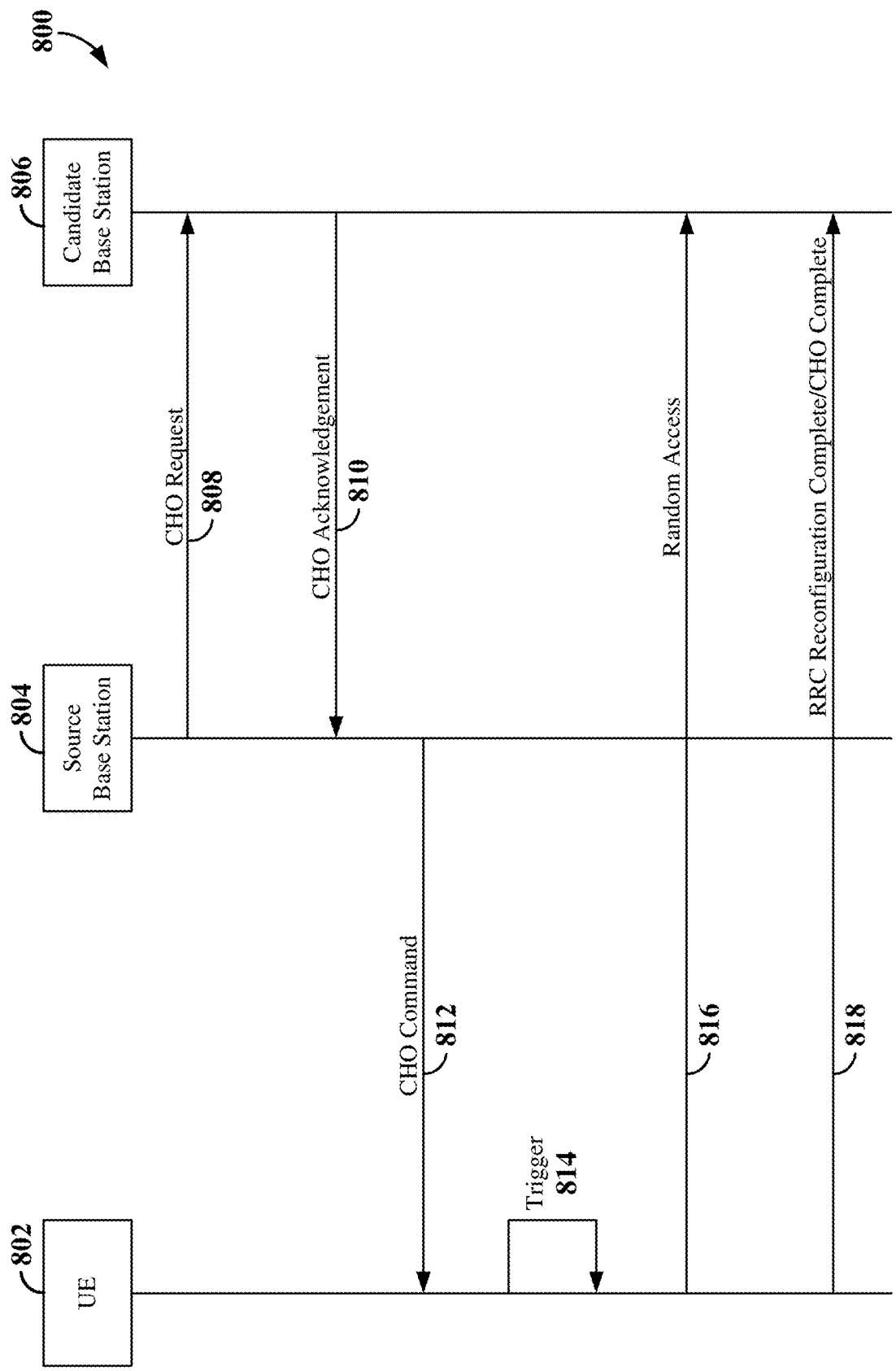
FIG. 8 is a diagram illustrating exemplary signaling for facilitating a conditional handover according to some aspects.

FIG. 8 illustrates exemplary signaling 800 for facilitating a CHO for a UE 802 between a source base station 804 and a candidate base station 806 according to some aspects. The base stations 804 and 806 may correspond to any of the base stations (e.g., eNBs or gNBs) or other scheduling entities illustrated in any of FIGS. 1 and/or 3-7. In addition, the UE 802 may correspond to any of the UEs or other scheduled entities illustrated in any of FIGS. 1 and/or 3-7.

In some examples, the source base station 804 may serve an anchor LTE cell to which the UE 802 is connected (e.g., the UE 802 is in an RRC connected state with the anchor LTE cell). In addition, the candidate base station 806 may serve as a candidate anchor LTE cell to which the UE 802 may perform a handover in NSA mode. In other examples, the source base station 804 and/or candidate base station 806 may be gNBs serving NR cells.

At 808, the source base station 804 may perform handover preparation procedures with one or more candidate base stations 806 (one of which is shown for convenience) to prepare for a potential future handover of the UE 802 from the source base station 804 to one of the candidate base stations. For example, the source base station 804 may transmit a CHO request message to the candidate base station 806. At 810, the candidate base station 806 may respond with a CHO acknowledgement message, which may include a CHO configuration for use by the source base station 804 in generating a CHO command for the UE 802. For example, the CHO configuration may include a RACH configuration for the candidate base station 806 providing resources for performing a random access procedure with the candidate base station 806.

At 812, the source base station 804 generates and transmits a CHO command to the UE 802. The CHO command may include, for example, a list of cells (e.g., candidate LTE anchor cells and/or candidate NR cells) to which the UE 802 may perform a handover, one or more triggering conditions for triggering the handover, a measurement configuration (e.g., measurement object) to enable the UE 802 to select the best candidate cell, and a respective random access channel (RACH) configuration for each of the candidate cells. The UE 802 may store the CHO command and monitor for a CHO condition associated with the candidate cells.

At 814, the UE 802 may determine that a triggering CHO condition has been satisfied. For example, using the additional measurement configuration, the UE 802 may determine that the signal strength or link quality of a candidate cell of the candidate base station 806 exceeds that of the serving cell of the source base station 804 for a predetermined amount of time or is an offset better than that of the serving cell. At 816, the UE 802 may then perform a random access procedure (e.g., using the RACH configuration in the CHO command) with the candidate base station 806, and at 818, transmit an RRC reconfiguration complete/CHO complete message to connect to the candidate base station 806.

In various aspects of the disclosure, a triggering condition for the conditional handover may include deconfiguration of the NR measurement objects prior to SCG addition. The triggering condition may be indicated (included) in the CHO command or may be preconfigured on the UE 802. For example, the UE 802 may utilize the CHO command to perform a handover to another LTE anchor cell (e.g., EN-DC anchor cell). Upon performing the handover, the new anchor cell may configure NR measurement objects for SCG addition by the new anchor cell.

Figure 9:
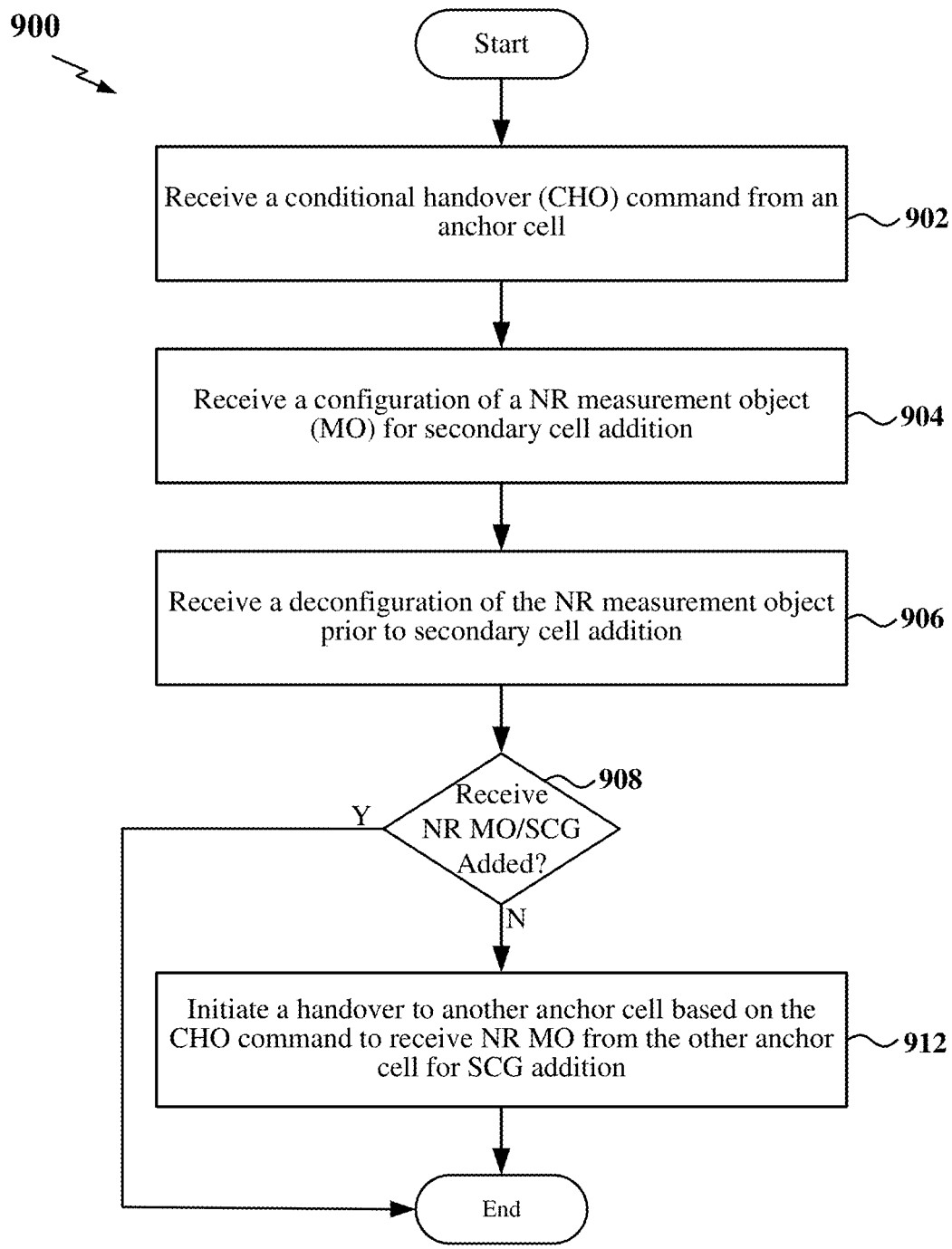
FIG. 9 is a flow chart illustrating an exemplary process for NR cell addition utilizing a conditional handover procedure in NSA mode according to some aspects.

FIG. 9 is a flow chart illustrating an exemplary process 900 for NR cell addition utilizing a conditional handover procedure in NSA mode according to some aspects. As described below, some or all illustrated features may be omitted in a particular implementation within the scope of the present disclosure, and some illustrated features may not be required for implementation of all examples. In some examples, the process 900 may be carried out by the UE 1100 illustrated in FIG. 11. In some examples, the process 900 may be carried out by any suitable apparatus or means for carrying out the functions or algorithm described below.

At block 902, the UE may receive a CHO command from an anchor cell to which the UE is connected. At block 904, the UE may receive a configuration of a NR measurement object (MO) for secondary (NR) cell addition. For example, the UE may receive an RRC reconfiguration message that configures one or more measurement objects (including NR measurement objects) on the UE to perform measurements (e.g., link quality measurements, such as SINR or RSRP) on one or more neighbor NR cells for NR cell addition in NSA mode.

At block 906, the UE may receive a deconfiguration of the NR measurement object prior to secondary (NR) cell addition. For example, the UE may receive an RRC reconfiguration message deconfiguring the NR measurement object when the UE encounters a delay in completing and reporting NR measurements to the anchor cell or when the anchor cell fails to add a SCG.

At block 908, the UE may determine whether a new NR MO has been received from the anchor cell or the anchor cell blind added a SCG (e.g., without receiving a NR measurement report from the UE). For example, the UE may determine whether a new NR MO is received or an SCG is blind added within a predetermined period of time from deconfiguration of the previous NR MO. If the UE does receive a new NR MO from the anchor cell or the SCG is blind added (Y branch of block 908), the process ends. However, if the UE does not receive (e.g., within the predetermined period of time) a new NR MO from the anchor cell or the SCG is not blind added (N branch of block 908), at block 912 the UE may initiate a handover to another anchor cell based on the CHO command to receive a NR MO from the other anchor cell for SCG addition.

Figure 10:
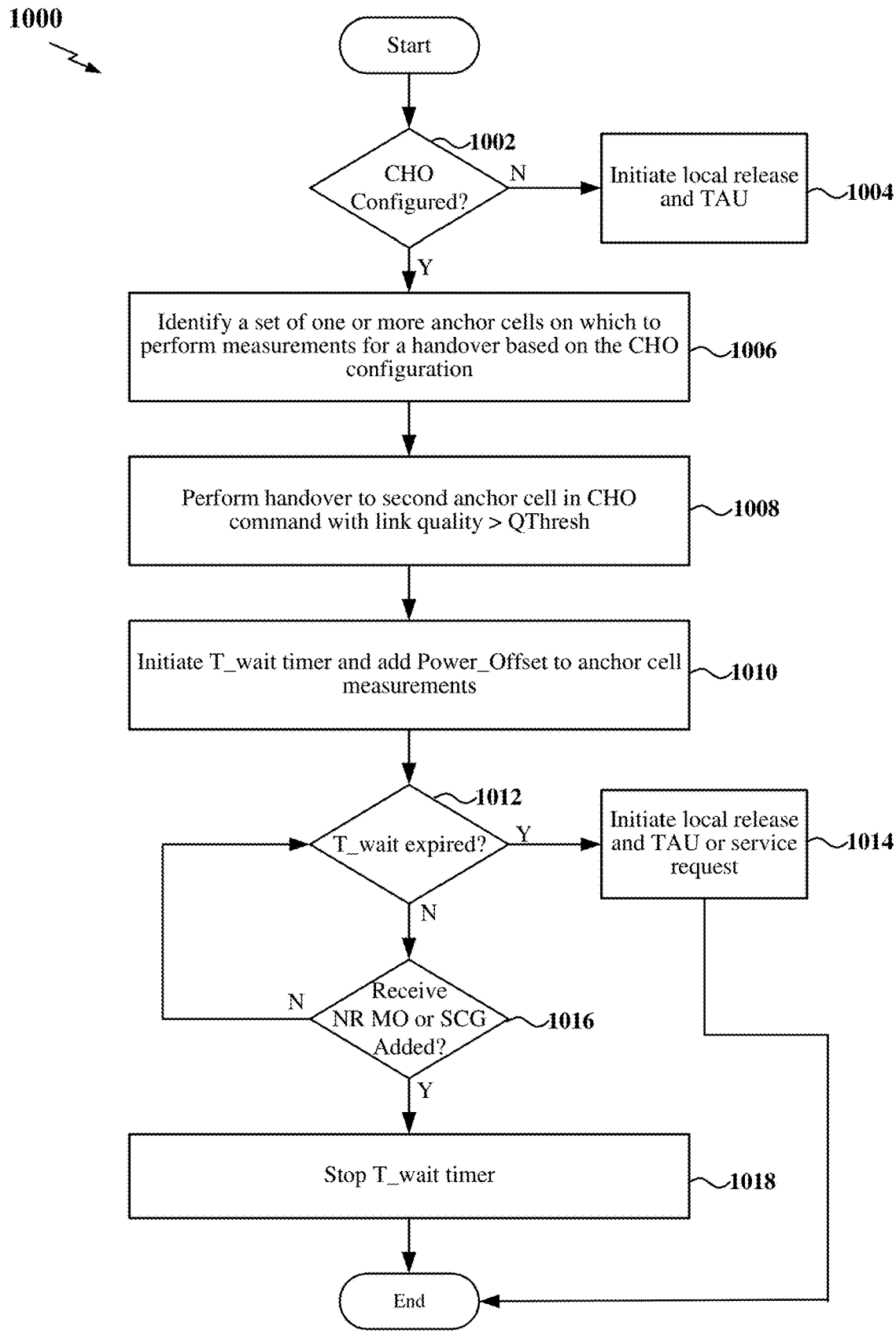
FIG. 10 is a flow chart illustrating an exemplary process for rapid NR cell addition after NR measurement object deconfiguration according to some aspects.

FIG. 10 illustrates a more detailed exemplary process 1000 for rapid NR cell addition after NR measurement object deconfiguration according to some aspects. As described below, some or all illustrated features may be omitted in a particular implementation within the scope of the present disclosure, and some illustrated features may not be required for implementation of all examples. In some examples, the process 1000 may be carried out by the UE 1100 illustrated in FIG. 11. In some examples, the process 1000 may be carried out by any suitable apparatus or means for carrying out the functions or algorithm described below.

At block 1002, the UE may determine whether the UE has received a CHO command from a first anchor cell to which the UE is connected. If the UE has not received a CHO command from the first anchor cell (N branch of block 1002), at block 1004, the UE may initiate a local release (e.g., a local release of the connection with the first anchor cell at the UE) and perform a tracking area update (TAU) to the first anchor cell to reestablish a session with the first anchor cell. The network (e.g., core network) may then configure data radio bearers (DRBs) for the UE and the first anchor cell may again configure NR measurement object(s) for the UE.

However, if the UE has received a CHO command (Y branch of block 1002), at block 1006, the UE may identify a set of one or more anchor cells on which to perform measurements for a handover based on the CHO configuration. For example, the UE may identify a list of anchor cells within the list of cells included in the CHO command.

The UE may then access a fingerprint database maintained by the UE and compare the list of anchor cells included in the CHO command to the fingerprint database to identify the one or more anchor cells on which to perform cell measurements to select an anchor cell for the handover. The fingerprint database may store anchor cell information that indicates anchor cells (e.g., LTE anchor cells) and neighbor NR FR1/FR2 cells for each anchor cell previously identified in the area within which the UE is located. Therefore, the UE may select the one or more anchor cells that have neighbor NR FR1/FR2 cells, as indicated in the fingerprint database. The set of one or more anchor cells within the list of cells included in the CHO command can then be considered candidate anchor cells to which the UE may perform a handover.

At block 1008, the UE may then perform a handover to a second anchor cell included in the CHO command. For example, the UE may perform measurements (e.g., link quality measurements, such as the SINR or RSRP) on each of the candidate anchor cells included in the CHO command (e.g., using the measurement configuration provided in the CHO command) to identify the second anchor cell. Here, the second anchor cell may have the best/highest link quality to which the UE performs the handover. In some examples, the second anchor cell may have a link quality (e.g., measured RSRP) that is greater than a threshold (QThresh). In some examples, QThresh may be preconfigured (e.g., by the OEM and/or based on NR standards or specifications) or may be dynamically configured by the UE or the network. For example, QThresh may be set equal to −1.05 dBm.

At block 1010, the UE may initiate a timer (T_wait timer) and add an offset (Power_Offset) to cell measurements performed on the second anchor cell upon performing the handover to the second anchor cell. For example, immediately after completing the handover, the UE may initiate the T_wait timer. The T_wait timer may be initiated with an amount or duration of time that the UE may wait for the second anchor cell to transmit an RRC reconfiguration message including a NR measurement object (NR MO) for the second anchor cell. In addition, the UE may add the Power_Offset to future cell measurements performed on the second anchor cell to avoid ping pong. In some examples, the duration of time of the T_wait timer and the Power_Offset may be preconfigured (e.g., by the OEM and/or based on NR standards or specifications) or may be dynamically configured by the UE or the network.

At block 1012, the UE may determine whether the T_wait timer has expired. If the T_wait timer has expired (Y branch of block 1012), at block 1014, the UE may initiate a local release and either perform a TAU or transmit a service request to the second anchor cell to reestablish a session with the second anchor cell to trigger a new RRC reconfiguration of a NR measurement object for the UE. If the T_wait timer has not yet expired (N branch of block 1012), at block 1016, the UE may determine whether a NR MO has been received from the second anchor cell or the second anchor cell blind added a SCG. If the UE received a NR MO from the second anchor cell or the second anchor cell blind added a SCG (Y branch of block 1016), at block 1018, the UE may stop the T_wait timer. Otherwise, the process reverts to block 1012 to determine whether the T_wait timer has expired.

Figure 11:
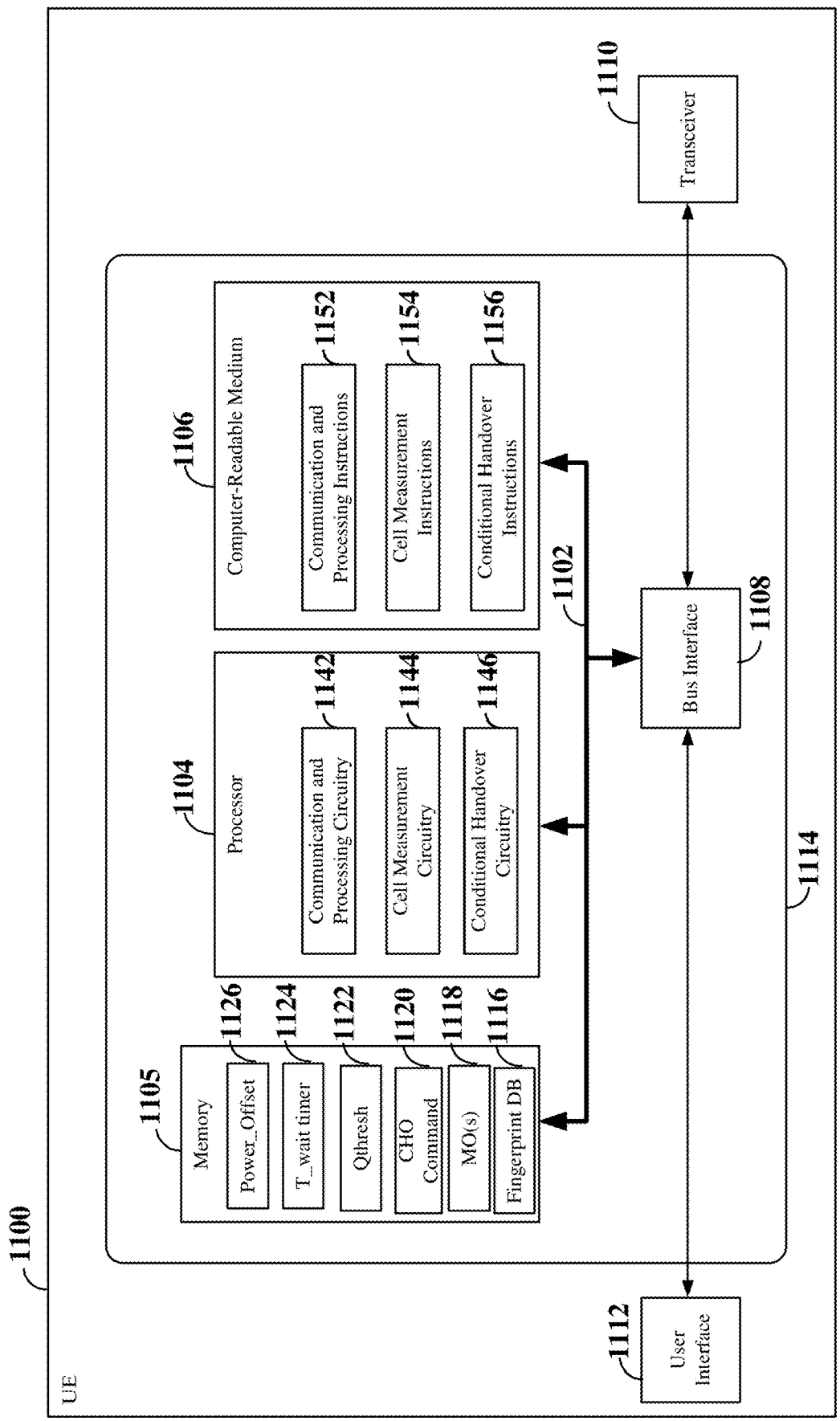
FIG. 11 is a block diagram conceptually illustrating an example of a hardware implementation for a scheduled entity according to some aspects.

FIG. 11 is a block diagram illustrating an example of a hardware implementation for a user equipment (UE) 1100 employing a processing system 1114. For example, the UE 1100 may be any of the UEs, wireless communication devices, or other scheduled entities illustrated in any one or more of FIGS. 1, 2 and/or 4-8.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in a UE 1100, may be used to implement any one or more of the processes and procedures described below and illustrated in FIGS. 7, 9, 10, and/or 12.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a communication interface or a means for communicating with various other apparatus over a transmission medium (e.g., air interface). Depending upon the nature of the apparatus, a user interface 1112 (e.g., keypad, display, speaker, microphone, joystick) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store one or more of a fingerprint database (fingerprint DB) 1116, one or more measurement object(s) (MO(s)) 1118, a CHO command 1120, a threshold (Qthresh) 1122, a timer (T_wait timer) 1124, and an offset (Power_Offset) 1126 that may be used by the processor 1104 in NR cell addition.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with one or more base stations (e.g., gNB or eNB) and/or TRPs supporting one or more cells (e.g., LTE anchor cells and/or NR secondary cells) via Uu links. For example, the communication and processing circuitry 1142 may be configured to communicate with an LTE anchor cell and one or more NR secondary cells for EN-DC communication in NSA mode. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1142 may include one or more transmit/receive chains.

In some implementations where the communication involves receiving information, the communication and processing circuitry 1142 may obtain information from a component of the UE 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

In some examples, the communication and processing circuitry 1142 may be configured to receive a conditional handover (CHO) command 1120 from a base station serving a first LTE anchor cell to which the UE is connected. The communication and processing circuitry 1142 may further store the CHO command 1120 within memory 1105. The CHO command may include, for example, a list of cells (e.g., candidate LTE anchor cells and/or candidate NR cells) to which the UE may perform a handover, one or more triggering conditions for triggering the handover, a measurement configuration (e.g., measurement object) to enable the UE to select the best candidate cell, and a respective random access channel (RACH) configuration for each of the candidate cells.

The communication and processing circuitry 1142 may further be configured to receive a configuration of a first measurement object (MO) 1118 for secondary cell addition (e.g., addition of a NR SCG) from the first anchor cell. In addition, the communication and processing circuitry 1142 may be configured to receive a deconfiguration of the first measurement object 1118 prior to secondary cell addition in the first anchor cell. The communication and processing circuitry 1142 may further be configured to transmit a RACH message and RRC reconfiguration complete/CHO complete message to perform a handover from the first anchor cell to a second anchor cell. In addition, the communication and processing circuitry 1142 may be configured to receive a second measurement object (MO) 1118 from the second anchor cell and to transmit a measurement report to the second anchor cell.

The communication and processing circuitry 1142 may further be configured to transmit a service request or a tracking area update to the second anchor cell. The communication and processing circuitry 1142 may further be configured to execute communication and processing instructions (software) 1152 stored in the computer-readable medium 1106 to implement one or more of the functions described herein.

The processor 1104 may further include cell measurement circuitry 1144, configured to perform cell measurements based on the MO(s) 1118 stored in memory 1105 and generate measurement reports including the measurements.

In some examples, the cell measurement circuitry 1144 may be configured to utilize the second MO 1118 received from the second anchor cell to perform respective measurements on one or more secondary cells (e.g., NR cells) indicated in the second MO 1118. For example, the cell measurement circuitry 1144 may be configured to measure the RSRP of one or more beam reference signals (BRSs), such as SSBs and/or CSI-RSs, transmitted by the one or more secondary cells. The cell measurement circuitry 1144 may further be configured to generate a measurement report including the cell measurements (e.g., RSRP of each measured BRS) to the second anchor cell.

The cell measurement circuitry 1144 may further be configured to perform respective measurements on a set of one or more anchor cells including the second anchor cell based on the CHO command 1120. For example, the cell measurement circuitry 1144 may be configured to measure a respective link quality (e.g., RSRP) associated with each of the one or more anchor cells included in the CHO command 1120.

The cell measurement circuitry 1144 may further be configured to perform a respective measurement on the first anchor cell to identify a first link quality (e.g., RSRP) of the first anchor cell and the second anchor cell to identify a second link quality (e.g., RSRP) of the second anchor cell after handover to the second anchor cell. The cell measurement circuitry 1144 may further be configured to add the offset (Power_Offset) 1126 to the second link quality to increase the second link quality with respect to the first link quality. For example, the cell measurement circuitry 1144 may be configured to apply the offset on the second anchor cell to avoid a ping pong handover back to the first anchor cell. Thus, the Power_Offset 1126 may be set based on the first link quality to ensure the second link quality, as modified by the Power_Offset 1126, exceeds the first link quality by an amount sufficient to prevent a handover from being initiated back to the first anchor cell. The cell measurement circuitry 1144 may further be configured to execute cell measurement instructions (software) 1154 stored in the computer-readable medium 1106 to implement one or more of the functions described herein.

The processor 1104 may further include conditional handover circuitry 1146, configured to monitor for a triggering condition associated with the CHO command 1120. The triggering condition may be included within the CHO command 1120 or maintained (e.g., within memory 1105) at the UE. For example, a triggering condition associated with the CHO command 1120 may include deconfiguration of the first measurement object on the first anchor cell. In some examples, the triggering condition may further include a lack of a new measurement object configuration for SCG addition on the first anchor cell within a predetermined period of time from deconfiguration. The conditional handover circuitry 1146 is further configured to perform a handover upon a triggering condition associated with the CHO command 1120 being satisfied. For example, the conditional handover circuitry 1146 may be configured to perform a handover to the second anchor cell based on the triggering condition being satisfied.

In some examples, the conditional handover circuitry 1146 may be configured to select the second anchor cell for the handover based on the link quality of the second anchor cell measured by the cell measurement circuitry 1144. In some examples, the conditional handover circuitry 1146 may be configured to select the second anchor cell in response to the link quality of the second anchor cell being greater than Qthresh 1122. In some examples, the conditional handover circuitry 1146 may be configured to select the second anchor cell based on a comparison between the respective link qualities measured by the cell measurement circuitry 1144 of each of one or more anchor cells listed in the CHO command 1120. In this example, the conditional handover circuitry 1146 may select the anchor cell having the highest link quality as the second anchor cell to which to perform the handover.

In some examples, the conditional handover circuitry 1146 may identify the set of one or more anchor cells included in the CHO command 1120 and instruct the cell measurement circuitry 1144 to perform measurements on each of the one or more anchor cells. For example, the CHO command 1120 may include a list of cells, which may include both anchor (LTE) cells and secondary (NR) cells. The conditional handover circuitry 1146 may identify a list of anchor cells within the list of cells. The conditional handover circuitry 1146 may then compare the list of anchor cells in the CHO command 1120 with the fingerprint DB 1116 to identify the set of one or more anchor cells on which the cell measurement circuitry 1144 should perform cell measurements for the conditional handover. The fingerprint DB 1116 maintains anchor cell information that indicates the anchor cells that have neighbor NR FR1/FR2 cells that may be utilized for SCG addition. Therefore, the conditional handover circuitry 1146 may select the one or more anchor cells that have neighbor NR FR1/FR2 cells, as indicated in the fingerprint DB 1116, for which the cell measurement circuitry 1144 may obtain cell measurements.

In some examples, the conditional handover circuitry 1146 may further be configured to initiate the T_wait timer 1124 upon performing the handover to the second anchor cell. The conditional handover circuitry 1146 may further be configured to stop the T_wait timer 1124 in response to receive the second MO 1118 from the second anchor cell or in response to a blind addition of at least one secondary cell (NR cell) on the second anchor cell. The conditional handover circuitry 1146 may further be configured to perform a local connection release from the second anchor cell and transmit either a service request or a tracking area update to the second anchor cell upon expiration of the T_wait timer 1124 to trigger the second anchor cell to send a new MO 1118 for SCG addition.

In some examples, the triggering condition for initiating a conditional handover may be maintained locally at the UE. In this example, the conditional handover circuitry 1146 may be configured to determine whether a CHO command 1120 has been received from the first anchor cell in response to the triggering condition being satisfied (e.g., deconfiguration of a measurement object 1118 with no new measurement object being received within a period of time from deconfiguration). If the UE has not received a CHO command 1120 from the first anchor cell at the time that the triggering condition is satisfied, the conditional handover circuitry 1146 may be configured to perform a local connection release from the first anchor cell and transmit a tracking area update to the first anchor cell to trigger the first anchor cell to send another MO 1118 for SCG addition. The conditional handover circuitry 1146 may further be configured to execute conditional handover instructions (software) 1156 stored in the computer-readable medium 1106 to implement one or more of the functions described herein.

Figure 12:
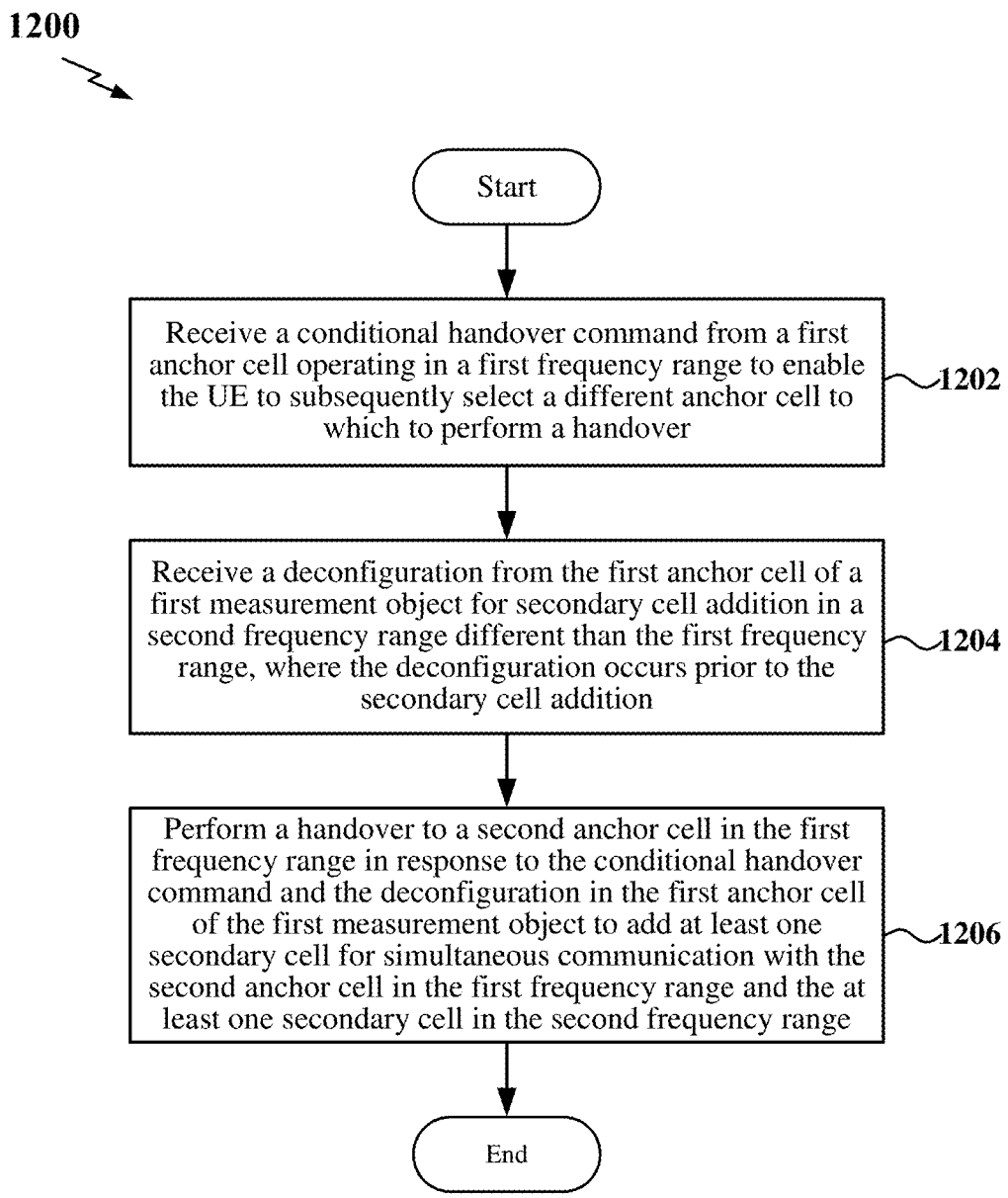
FIG. 12 is a flow chart illustrating an exemplary process for NR cell addition utilizing a conditional handover procedure in NSA mode according to some aspects.

FIG. 12 is a flow chart illustrating an exemplary process 1200 for NR cell addition utilizing a conditional handover procedure in NSA mode according to some aspects. As described below, some or all illustrated features may be omitted in a particular implementation within the scope of the present disclosure, and some illustrated features may not be required for implementation of all examples. In some examples, the process 1200 may be carried out by the UE 1100 illustrated in FIG. 11. In some examples, the process 1200 may be carried out by any suitable apparatus or means for carrying out the functions or algorithms described below.

At block 1202, a UE may receive a conditional handover command from a first anchor cell operating in a first frequency range to enable the UE to subsequently select a different anchor cell to which to perform a handover. For example, the communication and processing circuitry 1142 shown and described above in connection with FIG. 11 may provide a means to receive the conditional handover command.

At block 1204, the UE may receive a deconfiguration from the first anchor cell of a first measurement object for secondary cell addition in a second frequency range different than the first frequency range, where the deconfiguration occurs prior to the secondary cell addition. In some examples, the first frequency range is associated with a first radio access technology (RAT) and the second frequency range is associated with a second RAT. For example, the first RAT may be LTE, while the second RAT may be NR. For example, the communication and processing circuitry 1142 shown and described above in connection with FIG. 11 may provide a means to receive a deconfiguration of the first measurement object.

At block 1206, the UE may perform a handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range. In some examples, the UE may receive a second measurement object from the second anchor cell and transmit a measurement report to the second anchor cell in response to receiving the second measurement object from the second anchor cell to add the at least one secondary cell. In some examples, the UE may perform respective measurements on one or more secondary cells including the at least one secondary cell based on the second measurement object and transmit the measurement report comprising the respective measurements to the second anchor cell.

In some examples, the UE may initiate a timer upon performing the handover to the second anchor cell. In this example, the UE may stop the timer in response to receiving a second measurement object from the second anchor cell to add the at least one secondary cell or a blind addition of the at least one secondary cell on the second anchor cell. In addition, the UE may perform a local connection release from the second anchor cell at the UE and transmit a service request or a tracking area update to the second anchor cell to trigger reception of a new measurement object for a new secondary cell addition in response to expiration of the timer.

In some examples, the UE may select the second anchor cell based on a link quality of the second anchor cell. For example, the UE may select the second anchor cell in response to the link quality being greater than a threshold. In addition, the UE may perform respective measurements on a set of one or more anchor cells including the second anchor cell to identify a respective link quality of each of the one or more anchor cells and select the second anchor cell having a highest link quality among the respective link qualities of each of the one or more anchor cells.

In some examples, the UE may access a fingerprint database including anchor cell information associated with at least one previously identified anchor cell configured for dual connectivity with one or more respective secondary cells. The anchor cell information can include the set of one or more anchor cells. In this example, the conditional handover command may include a list of cells. The UE may identify a list of anchor cells within the list of cells and compare the list of anchor cells with the fingerprint database to identify the set of one or more anchor cells. For example, the conditional handover circuitry 1146 shown and described above in connection with FIG. 11 may provide a means to perform the handover.

Figure 13:
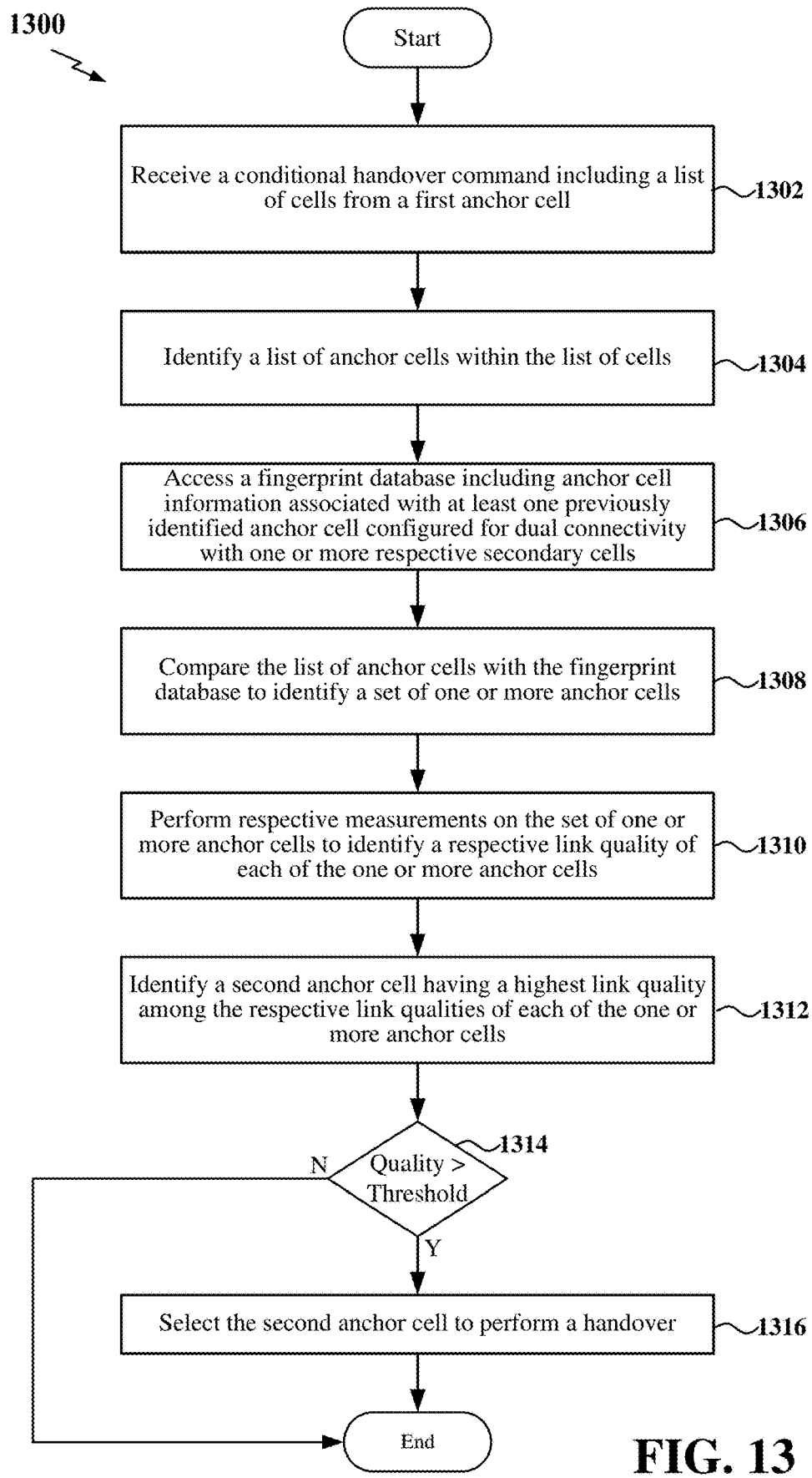
FIG. 13 is a flow chart illustrating an exemplary process for cell selection for performing a handover to facilitate NR cell addition in NSA mode according to some aspects.

FIG. 13 is a flow chart illustrating an exemplary process 1300 for cell selection for performing a handover to facilitate NR cell addition in NSA mode according to some aspects. As described below, some or all illustrated features may be omitted in a particular implementation within the scope of the present disclosure, and some illustrated features may not be required for implementation of all examples. In some examples, the process 1300 may be carried out by the UE 1100 illustrated in FIG. 11. In some examples, the process 1300 may be carried out by any suitable apparatus or means for carrying out the functions or algorithms described below.

At block 1302, a UE may receive a conditional handover command from a first anchor cell operating in a first frequency range to enable the UE to subsequently select a different anchor cell to which to perform a handover. For example, the communication and processing circuitry 1142 shown and described above in connection with FIG. 11 may provide a means to receive the conditional handover command.

At block 1304, the UE may identify a list of anchor cells (e.g., LTE anchor cells) within the list of cells. For example, the conditional handover circuitry 1146 shown and described above in connection with FIG. 11 may provide a means to identify the list of anchor cells.

At block 1306, the UE may access a fingerprint database including anchor cell information associated with at least one previously identified anchor cell configured for dual connectivity with one or more respective secondary cells. For example, the fingerprint database may store the anchor cells that have neighbor NR FR1/FR2 cells that may be utilized for SCG addition. For example, the conditional handover circuitry 1146 shown and described above in connection with FIG. 11 may provide a means to access the fingerprint database.

At block 1308, the UE may compare the list of anchor cells with the fingerprint database to identify a set of one or more anchor cells. Here, the set of one or more anchor cells may have neighbor NR FR1/FR2 cells, as indicated in the fingerprint database. For example, the conditional handover circuitry 1146 shown and described above in connection with FIG. 11 may provide a means to identify the set of one or more anchor cells.

At block 1310, the UE may perform respective measurements on the set of one or more anchor cells to identify a respective link quality of each of the one or more anchor cells. In some examples, the link quality may include the RSRP measured on a BRS transmitted from the respective anchor cell. For example, the cell measurement circuitry 1144 shown and described above in connection with FIG. 11 may provide a means to perform the cell measurements.

At block 1312, the UE may identify a second anchor cell having a highest link quality among the respective link qualities of each of the one or more anchor cells. For example, the conditional handover circuitry 1146 shown and described above in connection with FIG. 11 may provide a means to identify the second anchor cell.

At block 1314, the UE may determine whether the link quality of the second anchor cell is greater than a threshold (e.g., Qthresh). If the link quality is greater than the threshold (Y branch of block 1314), at block 1316, the UE may select the second anchor cell to perform a handover. For example, the conditional handover circuitry 1146 shown and described above in connection with FIG. 11 may provide a means to select the second anchor cell when the link quality of the second anchor cell is greater than the threshold.

Figure 14:
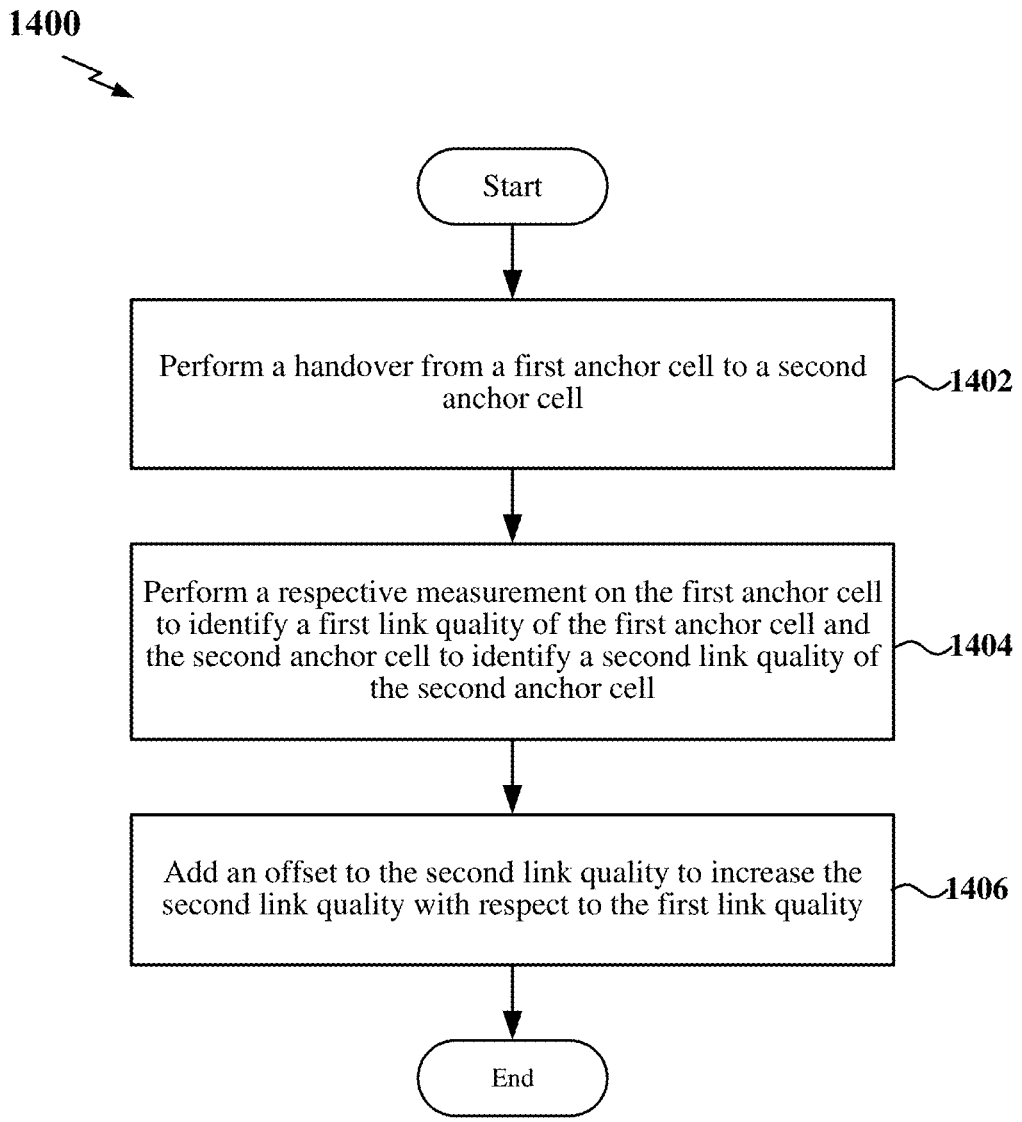
FIG. 14 is a flow chart illustrating an exemplary process for avoiding a ping pong handover according to some aspects.

FIG. 14 is a flow chart illustrating an exemplary process 1400 for avoiding a ping pong handover according to some aspects. As described below, some or all illustrated features may be omitted in a particular implementation within the scope of the present disclosure, and some illustrated features may not be required for implementation of all examples. In some examples, the process 1400 may be carried out by the UE 1100 illustrated in FIG. 11. In some examples, the process 1400 may be carried out by any suitable apparatus or means for carrying out the functions or algorithms described below.

At block 1402, a UE may perform a handover from a first anchor cell to a second anchor cell. For example, the UE may utilize a conditional handover command to select the second anchor cell to which the UE performs the handover. The handover may be performed, for example, in response to a deconfiguration in the first anchor cell of a measurement object prior to secondary cell addition. For example, the conditional handover circuitry 1146 shown and described above in connection with FIG. 11 may provide a means to perform the handover.

At block 1404, the UE may perform a respective measurement on the first anchor cell to identify a first link quality of the first anchor cell and the second anchor cell to identify a second link quality of the second anchor cell. For example, the UE may measure a respective RSRP of a respective BRS on each of the first anchor cell and the second anchor cell. For example, the cell measurement circuitry 1144 shown and described above in connection with FIG. 11 may provide a means to perform the respective measurements on the first and second anchor cells.

At block 1406, the UE may add an offset to the second link quality to increase the second link quality with respect to the first link quality. In some examples, the UE may apply the offset on the second anchor cell after completion of the handover to avoid a ping pong handover back to the first anchor cell. For example, the cell measurement circuitry 1144 shown and described above in connection with FIG. 11 may provide a means to add the offset to the second link quality.

In one configuration, an apparatus (e.g., UE 1100) configured for wireless communication includes means for performing the processes, procedures, and methods described in relation to FIGS. 9, 10, and 12-14. For example, the apparatus may include means for receiving a conditional handover command from a first anchor cell operating in a first frequency range to enable the UE to subsequently select a different anchor cell to which to perform a handover and means for receiving a deconfiguration from the first anchor cell of a first measurement object for secondary cell addition in a second frequency range different than the first frequency range, wherein the deconfiguration occurs prior to the secondary cell addition. The apparatus may further include means for performing a handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, and/or 4-8, and utilizing, for example, the processes and/or algorithms described herein in relation to FIGS. 9, 10, and 12-14.

The following provides an overview of examples of the present disclosure.

Example 1: A method of wireless communication at a user equipment (UE), comprising: receiving a conditional handover command from a first anchor cell operating in a first frequency range to enable the UE to subsequently select a different anchor cell to which to perform a handover; receiving a deconfiguration from the first anchor cell of a first measurement object for secondary cell addition in a second frequency range different than the first frequency range, wherein the deconfiguration occurs prior to the secondary cell addition; and performing the handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range.

Example 2: The method of example 1, wherein the first frequency range is associated with a first radio access technology (RAT) and the second frequency range is associated with a second RAT.

Example 3: The method of example 1 or 2, further comprising: receiving a second measurement object from the second anchor cell; and transmitting a measurement report to the second anchor cell in response to receiving the second measurement object from the second anchor cell to add the at least one secondary cell.

Example 4: The method of example 3, wherein the transmitting the measurement report further comprises: performing respective measurements on one or more secondary cells including the at least one secondary cell based on the second measurement object; and transmitting the measurement report comprising the respective measurements to the second anchor cell.

Example 5: The method of any of examples 1 through 4, further comprising: initiating a timer upon performing the handover to the second anchor cell.

Example 6: The method of example 5, further comprising: stopping the timer in response to receiving a second measurement object from the second anchor cell to add the at least one secondary cell or a blind addition of the at least one secondary cell on the second anchor cell.

Example 7: The method of example 5 or 6, further comprising: performing a local connection release from the second anchor cell at the UE and transmit a service request or a tracking area update to the second anchor cell to trigger reception of a new measurement object for a new secondary cell addition in response to expiration of the timer.

Example 8: The method of any of examples 1 through 7, further comprising: selecting the second anchor cell based on a link quality of the second anchor cell.

Example 9: The method of example 8, wherein the selecting the second anchor cell further comprises: selecting the second anchor cell in response to the link quality being greater than a threshold.

Example 10: The method of example 9, wherein the selecting the second anchor cell further comprises: performing respective measurements on a set of one or more anchor cells including the second anchor cell to identify a respective link quality of each of the one or more anchor cells; and selecting the second anchor cell having a highest link quality among the respective link qualities of each of the one or more anchor cells.

Example 11: The method of example 10, further comprising: accessing a fingerprint database comprising anchor cell information associated with at least one previously identified anchor cell configured for dual connectivity with one or more respective secondary cells, wherein the anchor cell information comprises the set of one or more anchor cells.

Example 12: The method of example 11, wherein the conditional handover command comprises a list of cells, and further comprising: identifying a list of anchor cells within the list of cells; and comparing the list of anchor cells with the fingerprint database to identify the set of one or more anchor cells.

Example 13: The method of any of examples 1 through 12, further comprising: performing a respective measurement on the first anchor cell to identify a first link quality of the first anchor cell and the second anchor cell to identify a second link quality of the second anchor cell; and adding an offset to the second link quality to increase the second link quality with respect to the first link quality.

Example 14: The method of example 13, wherein the adding the offset further comprises: applying the offset on the second anchor cell after completion of the handover to avoid a ping pong handover back to the first anchor cell.

Example 15: A user equipment (UE) configured for wireless communication comprising a transceiver, a memory, and a processor coupled to the transceiver and the memory, the processor and the memory configured to perform a method of any one of examples 1 through 14.

Example 16: An apparatus configured for wireless communication comprising means for performing a method of any one of examples 1 through 14.

Example 17: A non-transitory computer-readable medium having stored therein instructions executable by one or more processors of a user equipment (UE) configured for wireless communication to perform a method of any one of examples 1 through 14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-8, and/or 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c"

is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) configured for wireless communication, comprising:
    one or more memories; and
    one or more processors coupled to the one or more memories, wherein the one or more processors are configured to:
    receive a first measurement object for secondary cell addition in a second frequency range;
    receive a conditional handover command from a first anchor cell operating in a first frequency range different than the second frequency range to enable the UE to subsequently select a different anchor cell to which to perform a handover, the conditional handover command comprising a triggering condition for performing the handover, the triggering condition comprising a deconfiguration of the first measurement object prior to the secondary cell addition;
    receive the deconfiguration from the first anchor cell of the first measurement object for the secondary cell addition, wherein the deconfiguration occurs prior to the secondary cell addition; and
    perform the handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range.

2. The UE of claim 1, wherein the first frequency range is associated with a first radio access technology (RAT) and the second frequency range is associated with a second RAT.

3. The UE of claim 1, wherein the one or more processors are further configured to:
    receive a second measurement object from the second anchor cell; and
    transmit a measurement report to the second anchor cell in response to receiving the second measurement object from the second anchor cell to add the at least one secondary cell.

4. The UE of claim 3, wherein the one or more processors are further configured to:
    perform respective measurements on one or more secondary cells including the at least one secondary cell based on the second measurement object; and
    transmit the measurement report comprising the respective measurements to the second anchor cell.

5. The UE of claim 1, wherein the one or more processors are further configured to:
    initiate a timer upon performing the handover to the second anchor cell.

6. The UE of claim 5, wherein the one or more processors are further configured to:
    stop the timer in response to receiving a second measurement object from the second anchor cell to add the at least one secondary cell or a blind addition of the at least one secondary cell on the second anchor cell.

7. The UE of claim 5, wherein the one or more processors are further configured to:
    perform a local connection release from the second anchor cell at the UE and transmit a service request or a tracking area update to the second anchor cell to trigger reception of a new measurement object for a new secondary cell addition in response to expiration of the timer.

8. The UE of claim 1, wherein the one or more processors are further configured to:
    select the second anchor cell based on a link quality of the second anchor cell.

9. The UE of claim 8, wherein the one or more processors are further configured to:
    select the second anchor cell in response to the link quality being greater than a threshold.

10. The UE of claim 9, wherein the one or more processors are further configured to:
    perform respective measurements on a set of one or more anchor cells including the second anchor cell to identify a respective link quality of each of the one or more anchor cells; and
    select the second anchor cell having a highest link quality among the respective link qualities of each of the one or more anchor cells.

11. The UE of claim 10, wherein the one or more processors are further configured to:
    access a fingerprint database within the one or more memories comprising anchor cell information associated with at least one previously identified anchor cell configured for dual connectivity with one or more respective secondary cells, wherein the anchor cell information comprises the set of one or more anchor cells.

12. The UE of claim 11, wherein the conditional handover command comprises a list of cells, and wherein the one or more processors are further configured to:
    identify a list of anchor cells within the list of cells; and
    compare the list of anchor cells with the fingerprint database to identify the set of one or more anchor cells.

13. The UE of claim 1, wherein the one or more processors are further configured to:
    perform a respective measurement on the first anchor cell to identify a first link quality of the first anchor cell and the second anchor cell to identify a second link quality of the second anchor cell; and
    add an offset to the second link quality to increase the second link quality with respect to the first link quality.

14. The UE of claim 13, wherein the one or more processors are further configured to:
    apply the offset on the second anchor cell after completion of the handover to avoid a ping pong handover back to the first anchor cell.

15. A method of wireless communication at a user equipment (UE), comprising:
    receiving a first measurement object for secondary cell addition in a second frequency range;
    receiving a conditional handover command from a first anchor cell operating in a first frequency range different than the second frequency range to enable the UE to subsequently select a different anchor cell to which to perform a handover, the conditional handover command comprising a triggering condition for performing the handover, the triggering condition comprising a deconfiguration of the first measurement object prior to the secondary cell addition;
receiving the deconfiguration from the first anchor cell of the first measurement object for the secondary cell addition, wherein the deconfiguration occurs prior to the secondary cell addition; and
performing the handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range.

16. The method of claim 15, wherein the first frequency range is associated with a first radio access technology (RAT) and the second frequency range is associated with a second RAT.

17. The method of claim 15, further comprising:
receiving a second measurement object from the second anchor cell; and
transmitting a measurement report to the second anchor cell in response to receiving the second measurement object from the second anchor cell to add the at least one secondary cell.

18. The method of claim 15, further comprising:
initiating a timer upon performing the handover to the second anchor cell;
in response to receiving a second measurement object from the second anchor cell to add the at least one secondary cell or a blind addition of the at least one secondary cell on the second anchor cell, stopping the timer; and
in response to expiration of the timer, performing a local connection release from the second anchor cell at the UE and transmit a service request or a tracking area update to the second anchor cell to trigger reception of a new measurement object for a new secondary cell addition.

19. The method of claim 15, further comprising:
selecting the second anchor cell based on a link quality of the second anchor cell being greater than a threshold.

20. The method of claim 19, wherein the selecting the second anchor cell further comprises:
performing respective measurements on a set of one or more anchor cells including the second anchor cell to identify a respective link quality of each of the one or more anchor cells; and
selecting the second anchor cell having a highest link quality among the respective link qualities of each of the one or more anchor cells.

21. The method of claim 20, further comprising:
accessing a fingerprint database comprising anchor cell information associated with at least one previously identified anchor cell configured for dual connectivity with one or more respective secondary cells, wherein the anchor cell information comprises the set of one or more anchor cells.

22. The method of claim 21, wherein the conditional handover command comprises a list of cells, and further comprising:
identifying a list of anchor cells within the list of cells; and
comparing the list of anchor cells with the fingerprint database to identify the set of one or more anchor cells.

23. The method of claim 15, further comprising:
performing a respective measurement on the first anchor cell to identify a first link quality of the first anchor cell and the second anchor cell to identify a second link quality of the second anchor cell; and
adding an offset to the second link quality to increase the second link quality with respect to the first link quality.

24. The method of claim 23, wherein the adding the offset further comprises:
applying the offset on the second anchor cell after completion of the handover to avoid a ping pong handover back to the first anchor cell.

25. An apparatus configured for wireless communication, comprising:
means for receiving a first measurement object for secondary cell addition in a second frequency range;
means for receiving a conditional handover command from a first anchor cell operating in a first frequency range different than the second frequency range to enable the UE to subsequently select a different anchor cell to which to perform a handover, the conditional handover command comprising a triggering condition for performing the handover, the triggering condition comprising a deconfiguration of the first measurement object prior to the secondary cell addition;
means for receiving the deconfiguration from the first anchor cell of the first measurement object for the secondary cell addition, wherein the deconfiguration occurs prior to the secondary cell addition; and
means for performing the handover to a second anchor cell in the first frequency range in response to the conditional handover command and the deconfiguration in the first anchor cell of the first measurement object to add at least one secondary cell for simultaneous communication with the second anchor cell in the first frequency range and the at least one secondary cell in the second frequency range.

26. The apparatus of claim 25, further comprising:
means for receiving a second measurement object from the second anchor cell; and
means for transmitting a measurement report to the second anchor cell in response to receiving the second measurement object from the second anchor cell to add the at least one secondary cell.

27. The apparatus of claim 25, further comprising:
means for initiating a timer upon performing the handover to the second anchor cell;
means for stopping the timer in response to receiving a second measurement object from the second anchor cell to add the at least one secondary cell or a blind addition of the at least one secondary cell on the second anchor cell; and
means for performing a local connection release from the second anchor cell at the apparatus and transmit a service request or a tracking area update to the second anchor cell to trigger reception of a new measurement object for a new secondary cell addition in response to expiration of the timer.

28. The apparatus of claim 25, further comprising:
means for performing respective measurements on a set of one or more anchor cells including the second anchor cell to identify a respective link quality of each of the one or more anchor cells; and
means for selecting the second anchor cell having a highest link quality among the respective link qualities of each of the one or more anchor cells and based on the respective link quality of the second anchor cell being greater than a threshold.

29. The apparatus of claim 28, wherein the conditional handover command comprises a list of cells, and further comprising:
- means for accessing a fingerprint database comprising anchor cell information associated with at least one previously identified anchor cell configured for dual connectivity with one or more respective secondary cells, wherein the anchor cell information comprises the set of one or more anchor cells;
- means for identifying a list of anchor cells within the list of cells; and means for comparing the list of anchor cells with the fingerprint database to identify the set of one or more anchor cells.

30. The apparatus of claim 25, further comprising:
- means for performing a respective measurement on the first anchor cell to identify a first link quality of the first anchor cell and the second anchor cell to identify a second link quality of the second anchor cell; and
- means for adding an offset to the second link quality to increase the second link quality with respect to the first link quality after completion of the handover to avoid a ping pong handover back to the first anchor cell.

* * * * *